(12) United States Patent
Waxman

(10) Patent No.: US 10,141,974 B2
(45) Date of Patent: Nov. 27, 2018

(54) HIGH-CAPACITY FHSS-MA DEVICES AND METHODS

(71) Applicant: Shai Waxman, Sunnyvale, CA (US)

(72) Inventor: Shai Waxman, Sunnyvale, CA (US)

(73) Assignee: Shai Waxman, Sunnyvale, CA (US)

( * ) Notice: Subject to any disclaimer, the term of this patent is extended or adjusted under 35 U.S.C. 154(b) by 113 days.

(21) Appl. No.: 14/660,656

(22) Filed: Mar. 17, 2015

(65) Prior Publication Data
US 2016/0277064 A1   Sep. 22, 2016

(51) Int. Cl.
*H04B 1/713*  (2011.01)
*H04B 1/04*   (2006.01)
*H04B 7/26*   (2006.01)

(52) U.S. Cl.
CPC ........... *H04B 1/713* (2013.01); *H04B 1/0475* (2013.01); *H04B 7/2621* (2013.01)

(58) Field of Classification Search
None
See application file for complete search history.

(56) References Cited

U.S. PATENT DOCUMENTS

| | | | |
|---|---|---|---|
| 4,850,036 A | 7/1989 | Smith | |
| 5,323,391 A | 6/1994 | Harrison | |
| 5,719,857 A | 2/1998 | Heikkinen | |
| 6,006,075 A | 12/1999 | Smith et al. | |
| 6,018,644 A * | 1/2000 | Minarik | H01Q 3/267 455/561 |
| 6,028,853 A | 2/2000 | Haartsen | |
| 6,400,751 B1 | 6/2002 | Rodgers | |
| 6,519,460 B1 | 2/2003 | Haartsen | |
| 6,636,495 B1 | 10/2003 | Tangemann | |
| 6,690,657 B1 | 2/2004 | Lau et al. | |
| 7,145,934 B2 | 12/2006 | Liang | |

(Continued)

OTHER PUBLICATIONS

Huovinen, J. Implementation of Frequency Hopping code Phase Synchronization Method for Ad Hoc Networks (2008).

(Continued)

*Primary Examiner* — Steve R Young

(57) ABSTRACT

A frequency-hopped spread-spectrum multiple-access (FHSS-MA) wideband transceiver may support frequency-division multiple-access (FDMA) functionality by including a plurality of digital chains corresponding to FHSS-MA physical channels, individually and dynamically compensated for in-phase/quadrature imbalance in the transmit and/or receive portion. A FHSS-MA transceiver supporting FDMA functionality may coordinate FH sequence selection among FHSS physical channels to minimize inter-channel interference while also supporting legacy FHSS-enabled devices (e.g., Bluetooth®). The FHSS-MA transceiver may be incorporated into a wireless bridge device to facilitate low-latency communications over wireless local-area networks (WLANs), wireless wide-area networks (WWANs) or broadcast, with multiple FHSS-enabled devices that may be paired with the wireless bridge device using FHSS-MA channels. The wireless bridge device may enable a FHSS-enabled device to re-pair with a personal device. Such wireless bridge devices may be networked into a wireless bridge network that may increase the number of FHSS-enabled devices that may be accommodated and/or increase coverage range.

5 Claims, 21 Drawing Sheets

(56) References Cited

U.S. PATENT DOCUMENTS

| | | |
|---|---|---|
| 7,167,484 B2 | 1/2007 | Liang et al. |
| 7,411,926 B2 | 8/2008 | Batra et al. |
| 7,596,353 B2 | 9/2009 | Chung et al. |
| 7,656,892 B2 | 2/2010 | Barak et al. |
| 8,483,625 B2 * | 7/2013 | Milenkovic .......... G06F 1/0255 341/143 |
| 8,644,427 B2 * | 2/2014 | Porret .................... H04B 1/006 370/204 |
| 8,649,386 B2 | 2/2014 | Ansari et al. |
| 8,774,048 B2 | 7/2014 | Raveendran |
| 8,830,929 B2 | 9/2014 | Sun et al. |
| 9,813,281 B2 * | 11/2017 | Nadiri ................. H04B 1/0475 |
| 2003/0134596 A1 | 7/2003 | Zhu |
| 2004/0101068 A1 * | 5/2004 | Wang .................. H04B 1/7093 375/324 |
| 2004/0146121 A1 * | 7/2004 | Brown .................... H04B 1/30 375/322 |
| 2004/0184466 A1 | 9/2004 | Chang et al. |
| 2007/0047669 A1 * | 3/2007 | Mak ...................... H03D 3/007 375/316 |
| 2007/0070960 A1 | 3/2007 | Barak et al. |
| 2007/0291883 A1 * | 12/2007 | Welz ..................... H03D 3/009 375/350 |
| 2008/0159442 A1 * | 7/2008 | Tanabe ............... H04L 27/3863 375/324 |
| 2011/0194656 A1 * | 8/2011 | Shaked ............... H04L 27/0014 375/346 |
| 2014/0016581 A1 | 1/2014 | Jeon et al. |
| 2014/0293984 A1 | 10/2014 | Xhafa et al. |
| 2016/0173317 A1 * | 6/2016 | Bitton .................. H04L 27/364 455/114.2 |

OTHER PUBLICATIONS

Cheun et al., Performance of FHSS Multiple-Access networks using MFSK modulation (1996) IEEE Transaction on Communications, vol. 44(11), 1514-1526.

\* cited by examiner

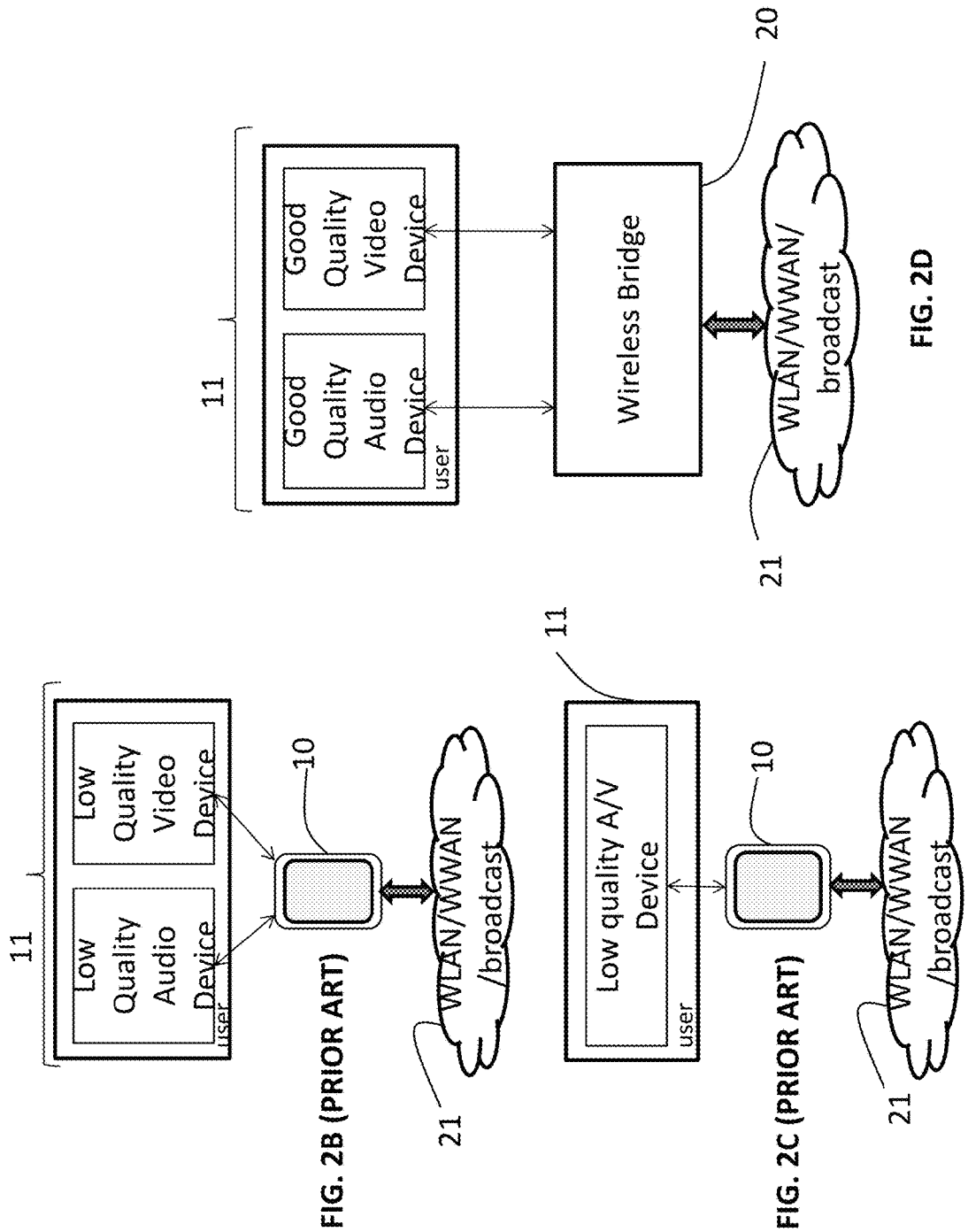

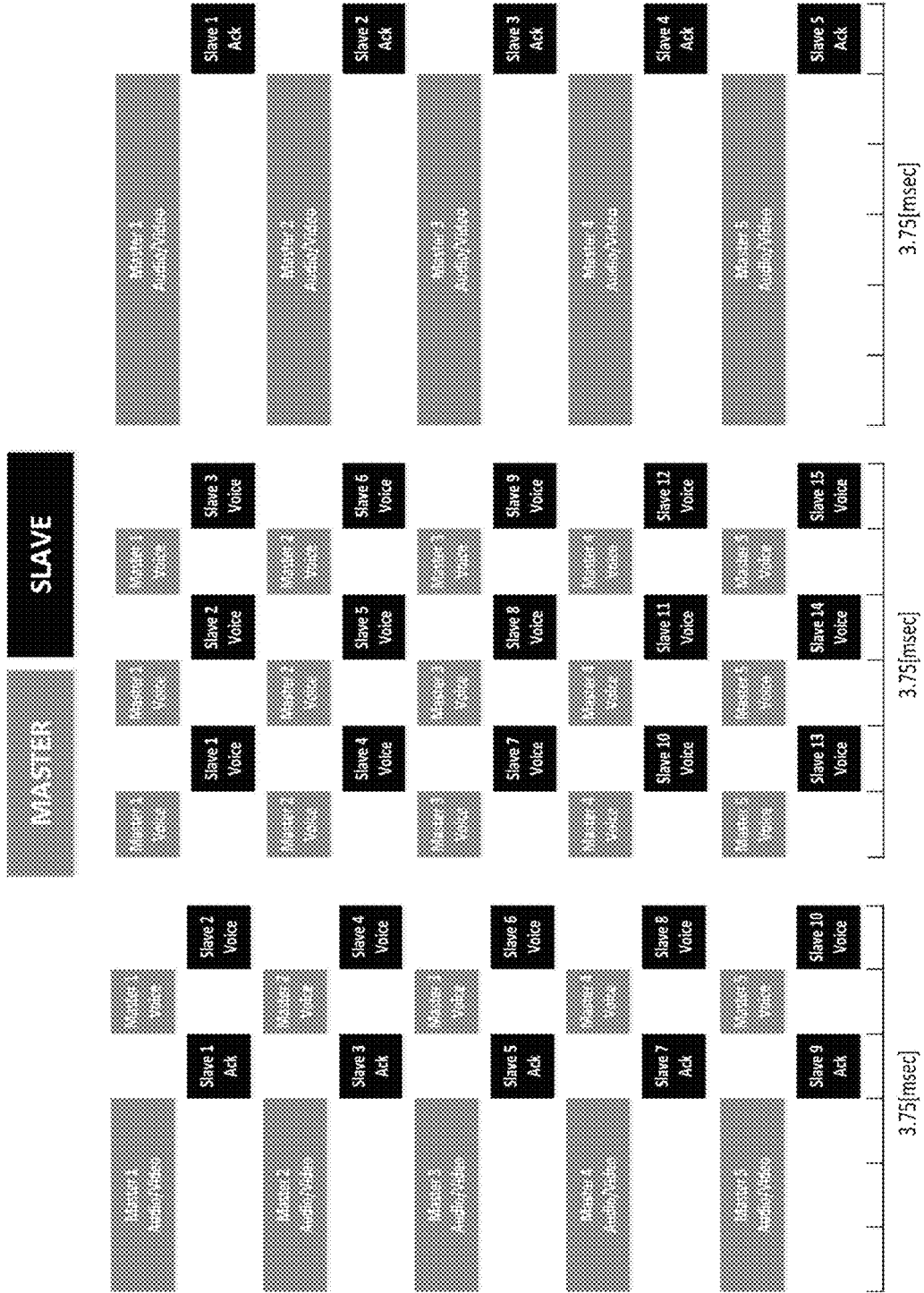

FIG. 9B Enhanced selection box

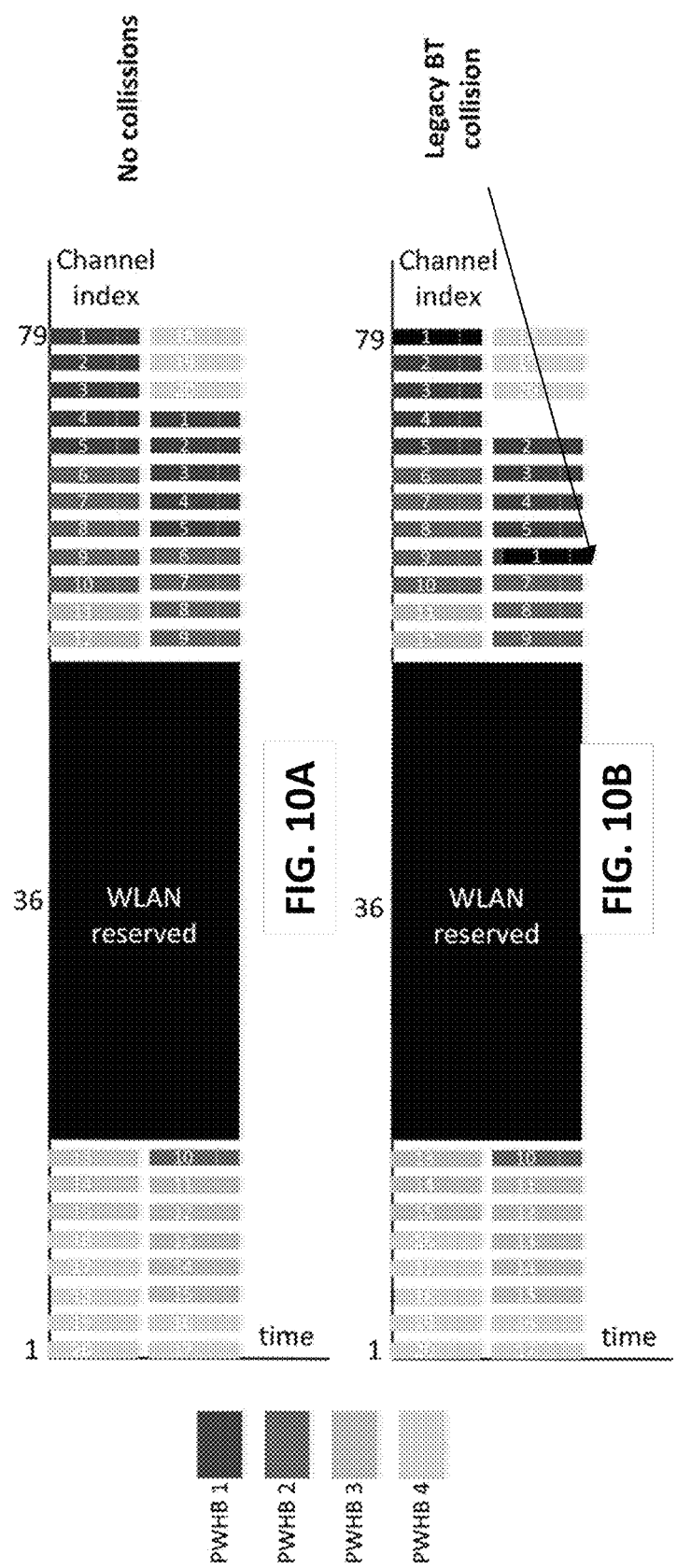

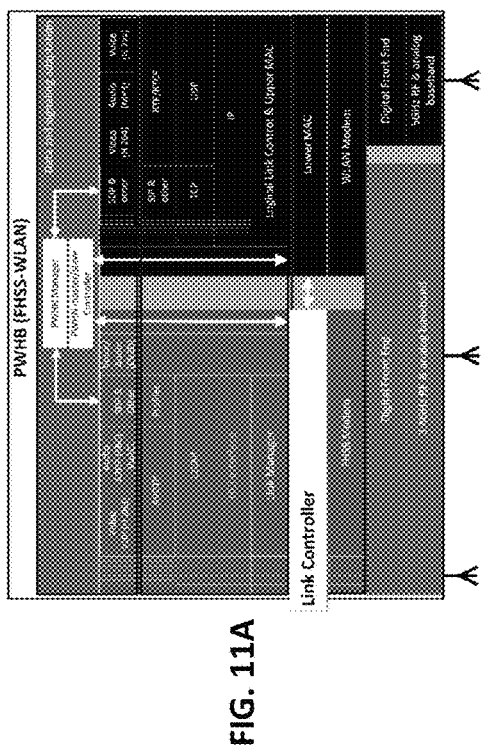
FIG. 11A
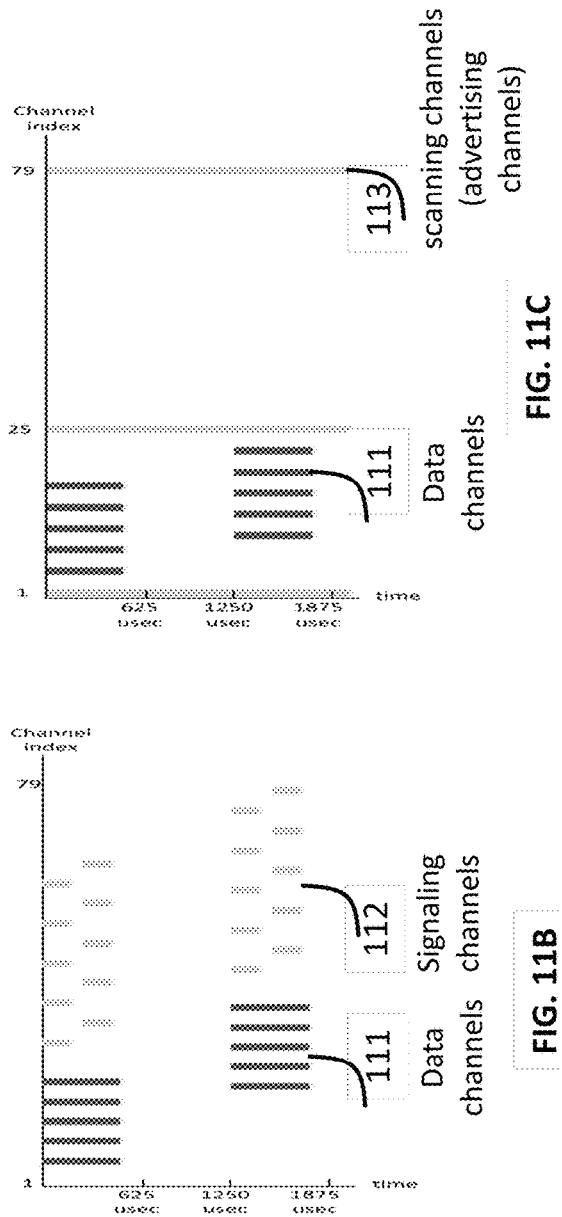
FIG. 11B
FIG. 11C

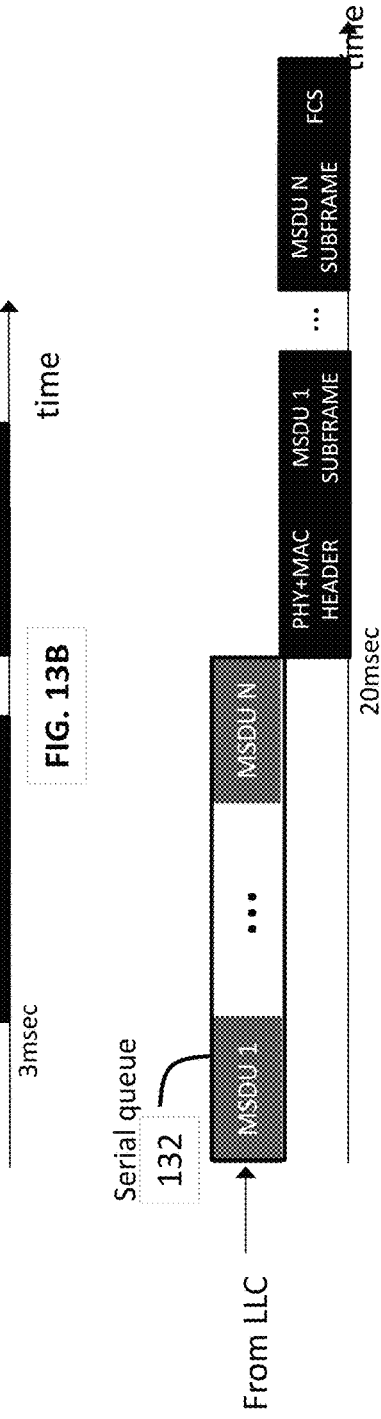
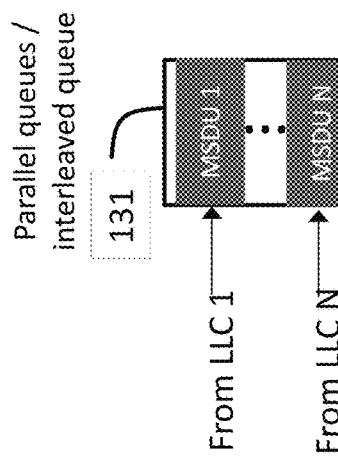
FIG. 13A
FIG. 13B
FIG. 13C

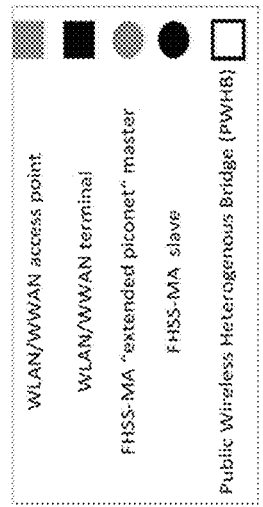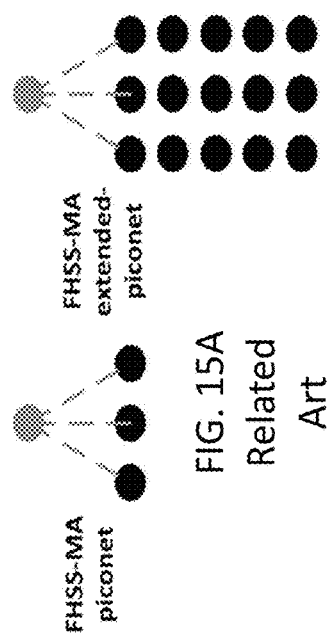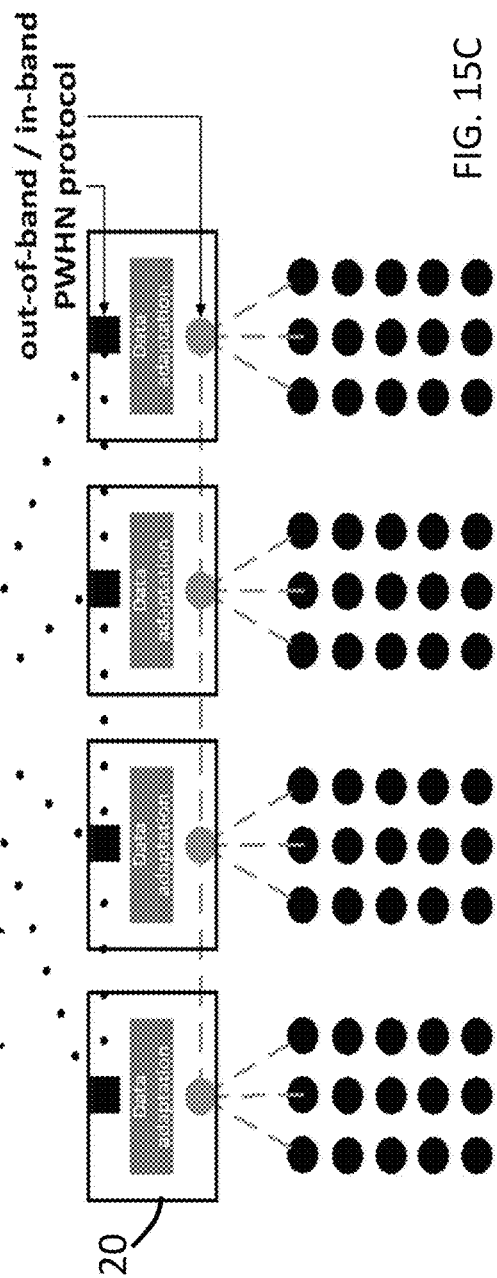
FIG. 15A
Related Art
FIG. 15B
FIG. 15C

PWHN synchronization and identification (example)

PWHN-slaves synchronize on a common PWHN clock from which the WPAN FHSS clock is derived

HIGH-CAPACITY FHSS-MA DEVICES AND METHODS

FIELD OF ENDEAVOR

Various aspects of this disclosure may pertain to wireless communications and, more particularly, to communications using frequency-hopped spread-spectrum (FHSS) devices, and more particularly, to communications using FHSS devices that can communicate with multiple user devices concurrently in FHSS-multiple-access (FHSS-MA) system.

BACKGROUND

Wearable devices and other Internet-of-Things (IoT) devices have recently become a very hot topic. Wireless multimedia wearable devices, such as Google Glass® and the like, iWatch® and the like, and miniature wireless earbuds and cameras have ignited the imaginations of many millions of people around the world. They can potentially provide superior user experience while still being small and easy to carry; and autonomous and environmentally friendly (lower radiation at the user's proximity and carrying smaller toxic batteries).

Battery capacity is a major obstacle for a successful wearable multimedia design. Given the small form-factor required, the battery size, and thus capacity, is heavily constrained. A wireless connectivity device within such a wearable multimedia design may typically be one of the most power-hungry building blocks; to wit, a cellular network device or a wireless local-area network (WLAN) connectivity device can drain the largest wearable fully-charged battery to date within two hours of talk time. Including video, the largest wearable fully-charged battery is drained in less than 30 minutes.

Use of a WLAN as a means by which a multimedia device accesses the network may impose additional drawbacks. Typically, only small numbers of multimedia users, spread across a substantially large area, can conduct reliable high QoS (Quality of Service) multimedia sessions concurrently, due to fundamental WLAN media access limitations. As result only 5% of the WLAN capacity may end up being utilized. As result, the wired infrastructure is in most cases underutilized, while the cellular infrastructure is congested in many cases (e.g. schools).

Use of Digital Enhanced Cordless Telecommunications (DECT) technology as a means by which a multimedia device accesses the network, provides a partial solution to the problems presented above (power consumption, underutilized wireline infrastructure) by potentially decreasing the mobile device's power consumption and supporting more users concurrently. However, it is not compatible with billions of existing consumer connectivity devices (e.g. Bluetooth® and WLAN), is expensive to integrate due to having multiple bands of operation and has a protocol stack that is optimized for voice.

The Bluetooth® low-power connectivity solution, on the other hand, makes it the favorite candidate for being the connectivity standard of choice for wearable multimedia devices and other small-form-factor battery-driven devices. It can support multiple hours of talk time before draining even the smaller batteries and has a minimal data throughput sufficient for basic-rate multimedia sessions. However, reducing the power consumption does not come without a drawback: as the small device's radiated power is decreased to ~2 mW, and being more susceptible to frequency selective fading, the Bluetooth® signal cannot be received beyond 10 meters indoors (2-3 walls on average), 20 meters in office environments (no walls) and up to 30 meters outdoors, when using low-cost transceivers.

Smartphones (or other handheld devices (e.g., tablet computers) and personal computers) may be used also as a personal wireless bridge, assisting the low-power, now dependent, Bluetooth® devices in communicating via at least one of the wireless networks, such as, but not limited to, cellular networks or wireless LANs. The smartphone's small form factor enforces implementation of co-existence techniques (for example, Bluetooth®/WLAN time sharing) that may potentially further degrade the network performance and may limit the Bluetooth® device range due to not having multi-antenna communications capability.

It may, therefore, be desirable to develop systems/environments in which multiple users may be able to use small and low power devices, such as Bluetooth®-enabled devices, without the need for a smartphone or other portable, but larger, device to be carried along as a bridge device, and yet to still be able to communicate multimedia content concurrently, at an extended range and for long durations of time before draining the small battery, via WLANs or other wired or wireless networks (e.g., wireless wide-area networks (WWANs)), or broadcasted multimedia (e.g., broadcast radio, TV, media players).

SUMMARY OF VARIOUS EMBODIMENTS

Various aspects of this disclosure present devices and techniques that may be used to facilitate such communications. In one aspect, a wireless bridge device may be provided that may permit concurrent multimedia (video, high quality audio, voice and data) communications over multiple frequencies of multiple small, low-power FHSS-enabled wireless devices (e.g., Bluetooth®-enabled devices) and may allow them to interface with wireless local-area networks (WLANs) and/or other networks (e.g., wireless wide-area networks (WWANs), broadcast (e.g., radio, TV, media players) in order to facilitate communication using the devices and without the user being required to carry around a personal communication device (e.g., mobile telephone, personal digital assistant (PDA), tablet computer, personal computer, etc.) with which to pair the devices.

For example, a Bluetooth®-enabled headset may be useful, in such a scenario, to conduct telephone calls without being paired with the user's mobile device; multiple such headsets may pair and communicate concurrently over multiple frequencies with the wireless bridge device, which may then connect the headsets to a WLAN (e.g., but not limited to, a WiFi® (IEEE 802.11) network) or a WWAN, which may facilitate, for example, Voice-over-Internet-Protocol (Voice-over-IP or VoIP) telephone calls or other services. Due to its multi-user capability and its support in at least two communication protocols, with at least one being a FHSS-MA protocol, such device may herein be referred to as a Public Wireless Heterogeneous Bridge (PWHB), or simply put, wireless bridge.

The wireless bridge device, according to various aspects of this disclosure, may further permit larger FHSS-enabled devices, such as, but not limited to, smartphones, tablet computers, handsets, etc., to save power, lower their radiation and possibly save costs by communicating via the bridge device, instead of directly through wireless networks (e.g., WLANs or WWANs).

The wireless bridge device, according to various aspects of this disclosure, may be able to split multimedia streams between or among multiple FHSS-enabled user devices communicating over multiple frequencies. For example, the wireless bridge may enable a Bluetooth®-enabled headset and another Bluetooth®-enabled device equipped with a display (e.g., a watch) carried by the same user to share the multimedia stream while communicating concurrently using different frequencies, which may thus avoid wires and may improve both audio and video communications quality.

Adding frequency-division multiple-access (FDMA) capability to a FHSS-MA transceiver communicating indoors may requires tight (low latency) power control of the in-network FHSS-enabled user devices. The FHSS-MA power control mechanism does not mitigate possibly strong interfering signals of adjacent devices that communicate over the same frequency band (e.g. WLAN, WPAN, DECT devices). Mitigating such interference and/or relaxing the tight power control mechanism requirement, and still being able to come up with a low-cost FDMA high-capacity FHSS-MA device, may be accomplished by the use of, for example, a dynamic balancing technique for in-phase (I) and quadrature (Q) signals within the transceiver, which technique may be implemented digitally. Such a transceiver may be incorporated into the wireless bridge device.

A Bluetooth® device may operate using FHSS time-division multiple-access (TDMA) and time-division duplexing (TDD) techniques. According to some aspects of this disclosure, the Bluetooth® standard protocol may be enhanced with FDMA capability, which may enable improvement in the number and quality of simultaneous FHSS-MA communications, and may also provide improved hardware efficiency by coordinating channel use among, including both the enhanced and standard Bluetooth® devices, to minimize cross interference between them. A device that is capable of supporting both such an enhanced Bluetooth® protocol and the standard protocol may be referred to herein as a Bluetooth®-enabled device (vs. a Bluetooth® standard device). The FHSS-MA wireless bridge device, according to various aspects of this disclosure, may incorporate such an enhanced Bluetooth® protocol.

The wireless bridge device, according to various aspects of this disclosure, may further be able to utilize low-latency aggregation of multimedia content sent from multiple FHSS-enabled devices over the WLAN, which may also improve the WLAN efficiency and may significantly reduce overall network latency.

A wireless bridge device, according to various aspects of this disclosure, may further be able to form networks with other such devices and to coordinate with the other such devices to enhance communications (e.g., but not limited to, increasing range, reducing interference, and/or other possibilities). According to one aspect, handover of a moving communicating device from one bridge device to another may be supported. Such a network of bridge devices may, according to some aspects, be in the form of an autonomous master-slave network.

These and other aspects of the disclosure described below may be implemented alone and/or in various combinations. Furthermore, implementations of various devices and techniques may be in the form of hardware, software, firmware, etc., and/or combinations thereof.

BRIEF DESCRIPTION OF THE DRAWINGS

Various aspects of this disclosure will now be described in connection with the attached drawings, in which:

FIGS. 2A-2D show various environments in which various aspects of the disclosure may operate;

FIG. 5, consisting of FIGS. 5A-5C, shows front end hardware that may be included in a wireless bridge device according to an aspect of the invention, where

FIGS. 6A, 6B, and 6C show conceptual block diagrams of wireless bridge transceiver configurations according to various aspects of the disclosure, while

FIGS. 8A, 8B, and 8C show conceptual examples of time synchronization according to various aspects of the disclosure;

FIGS. 10A and 10B show conceptual diagrams of how the frequency coordination technique may be used, according to aspects of the disclosure;

FIGS. 11A-11C show conceptual examples of multi-channel signaling and multi-channel scanning techniques and where they may fit into the hierarchy of FIG. 3, according to aspects of the disclosure;

FIGS. 13A-13C show a conceptual flow block diagram of the use of aggregation, as well as where, conceptually, this may fit in the hierarchy of FIG. 3, according to some aspects of the disclosure;

FIGS. 15A, 15B and 15C show conceptual block diagrams of various aspects of a wireless bridge network and related concepts, according to various aspects of the disclosure;

DETAILED DESCRIPTION OF VARIOUS ASPECTS OF THE DISCLOSURE

Various aspects of the present disclosure are now described with reference to the accompanying drawing figures, it being appreciated that the figures may illustrate the subject matter of various embodiments and may not be to scale or to measure.

Figure 1:
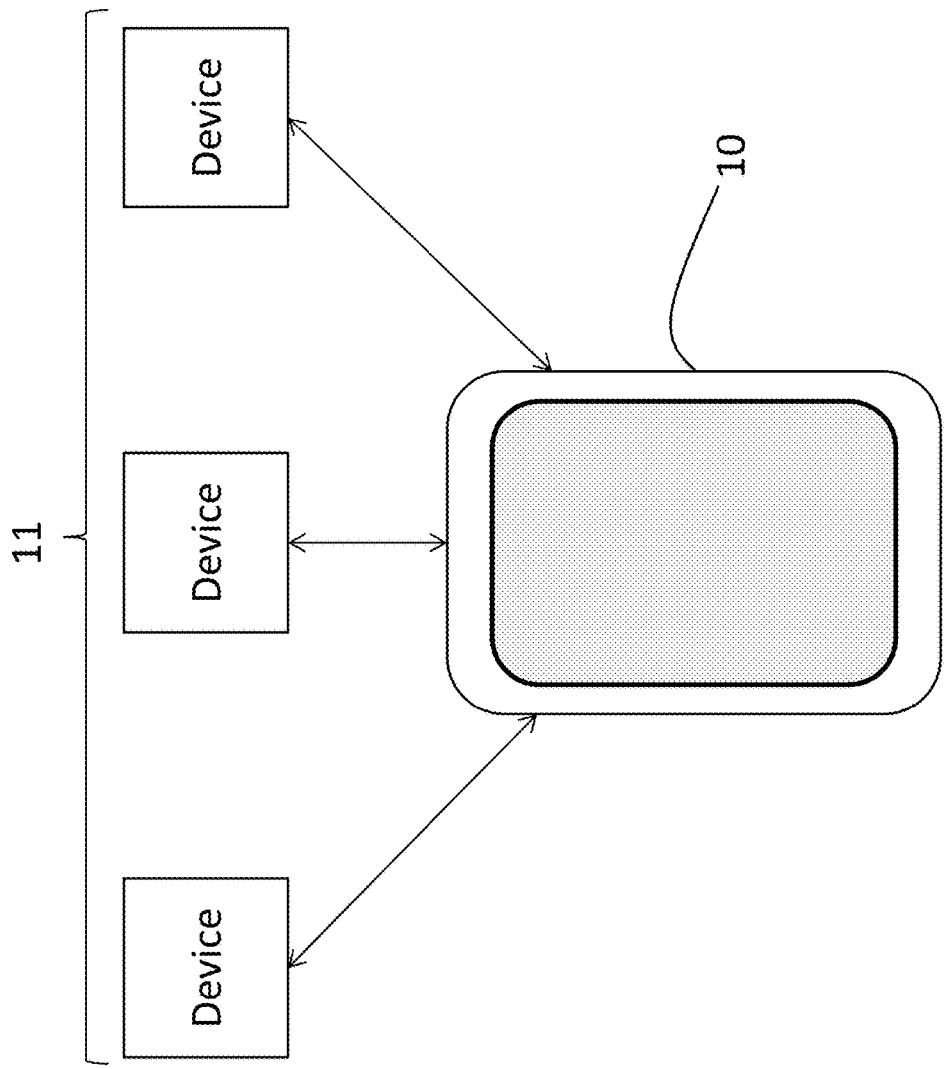
FIG. 1 shows a related system.

FIG. 1 shows a Bluetooth® (FHSS-TDMA-TDD) standard configuration. A mobile telephone (which may be a smartphone), tablet computer, or other device 10 may be wirelessly connected with one or more Bluetooth® standard devices 11, which may include, but are not limited to wireless headsets, wireless displays, wireless keyboards or other input and/or output (I/O) devices. For example, according to the Bluetooth® specifications, the different devices 11 are "paired" with the device 10, in which the device 10 may be the master and the devices 11 may be slaves. The slave devices 11 may communicate with the master using FHSS-TDMA-TDD techniques that may be coordinated by the master device 11. Up to three Bluetooth®-enabled devices may be able to simultaneously communicate voice, and only one Bluetooth®-enabled device may be able to communicate audio/video multimedia reliably.

Figure 2A:
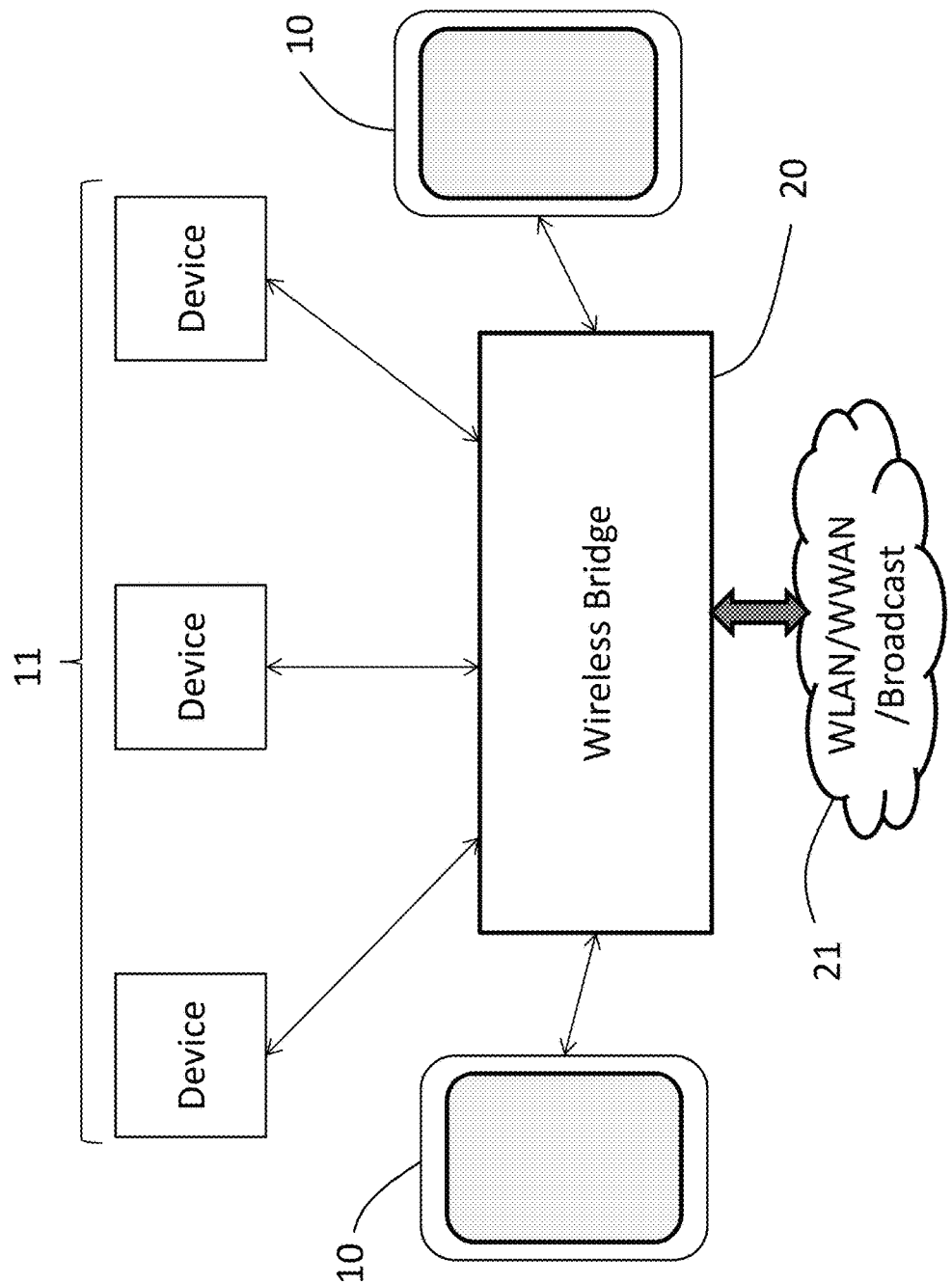

FIG. 2A shows an example of a wireless bridge 20 according to an aspect of the disclosure. Various FHSS-enabled devices 11 (e.g., Bluetooth®-enabled devices), which may have previously only been capable of communications through a FHSS-MA personal wireless bridge device 10, as in FIG. 1, may be wirelessly connected to the FHSS-MA bridge 20 and be able to simultaneously communicate all sorts of multimedia content (data, voice, audio and video) over multiple frequencies. Such wireless connection may be performed in a manner similar to the pairing process in Bluetooth® networks; however, the invention is not thus limited, and other FHSS-MA protocols may be used. In a similar fashion, other FHSS-enabled devices, such as, but not limited to, smartphones and tablet computers 10, may also be wirelessly connected to the wireless bridge 20. The wireless bridge 20 may provide connectivity to one or more WLANs and/or WWANs 21, to permit a connected device 10, 11 to communicate, e.g., with remotely-located devices. For example, the WLAN or WWAN 21 may enable VoIP calling by means of the Internet or some other communication network, or other types of communication, which may include one-way and/or bi-directional multimedia communication.

FIG. 2D shows a further example of a wireless bridge 20 according to an aspect of the disclosure. Various FHSS-enabled (e.g., Bluetooth®-enabled) devices 11, which may have previously only been capable of communications through a FHSS-MA personal wireless bridge device 10 (e.g., smartphone), as in FIG. 1, and as also reflected in FIGS. 2B and 2C, may be wirelessly connected to the FHSS-MA bridge 20 and may be able to simultaneously communicate split session multimedia content (data, voice, audio and video) of the same multimedia session at an improved quality, over multiple frequencies. Wireless bridge 20 may multiplex and de-multiplex higher quality audio/visual (A/V) stream and synchronize their component audio and video streams by adjusting their individual delay buffers while communicating with the various FHSS-enabled audio and video devices 11. For example, a Bluetooth®-enabled watch may communicate video content while a Bluetooth®-enabled headset may communicate audio content. The wireless bridge 20 may provide connectivity to one or more WLANs and/or WWANs and/or broadcast 21, to permit a connected device 10, 11 to communicate, e.g., with remotely-located devices. For example, the WLAN or WWAN may enable A/V by means of the Internet or some other communication network, or other types of communication, which may include one-way and/or bi-directional multimedia communication.

Figure 3:
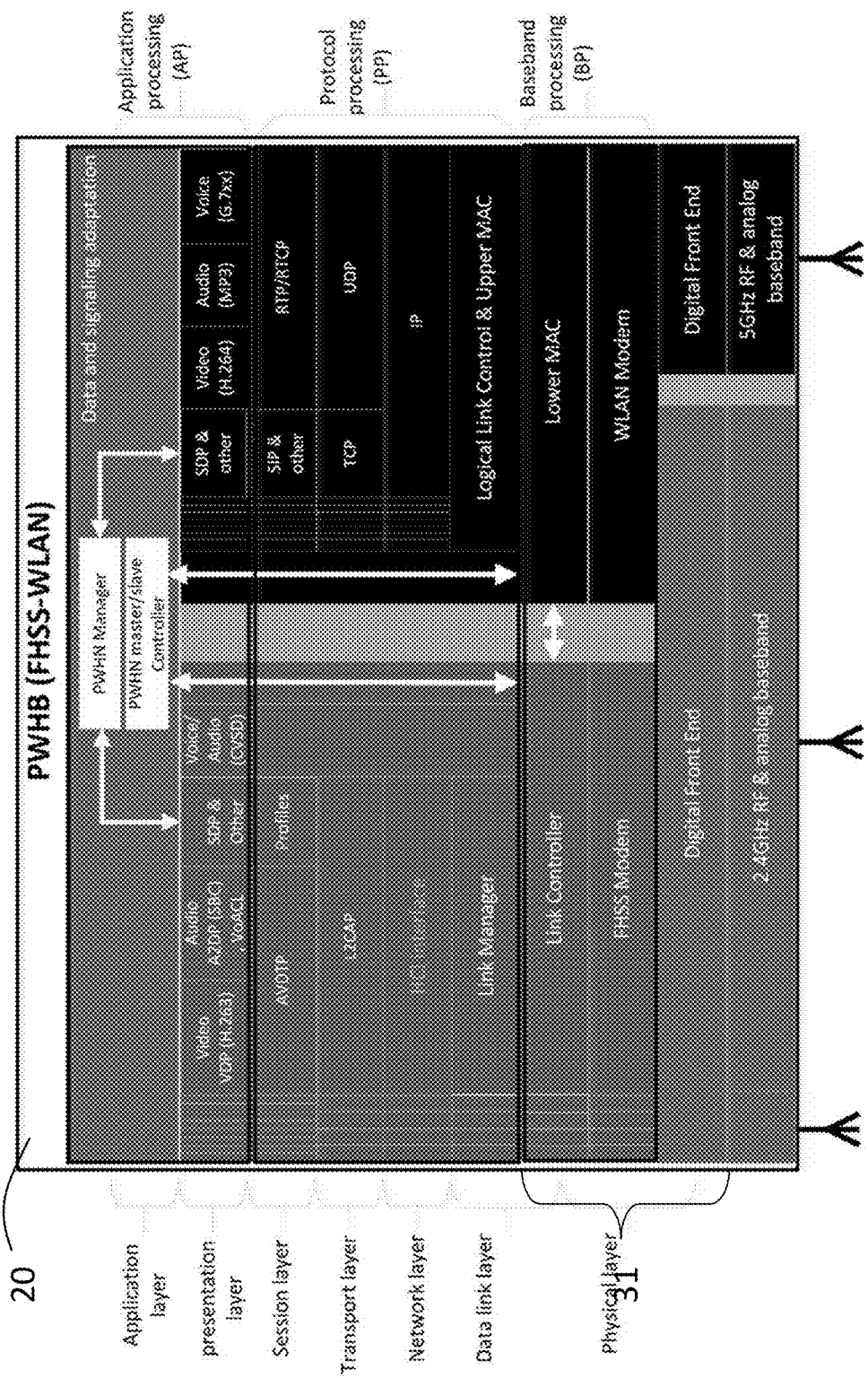
FIG. 3 shows a conceptual diagram of a wireless bridge device according to various aspects of the disclosure.

FIG. 3 shows a conceptual diagram of a public wireless heterogeneous bridge (PWHB), or simply put, wireless bridge, 20 according to various aspects of the disclosure. The "heterogeneous" nature of wireless bridge 20 lies in that it may be capable of interfacing with at least two different communications protocols with one being an FHSS protocol (e.g., Bluetooth®-enabled), while the "public" nature of it lies in that it may support communications with multiple users by incorporating multi-user multi-threaded (SW) and/or multi-core and/or pipelined-core (HW) realization of a FHSS protocol at various layers of the Open Systems Interconnect (OSI) model and/or other communication protocol models. The implementation of the wireless bridge 20 will be explained further below, both with reference to FIG. 3 and other figures to be discussed.

Figure 4:
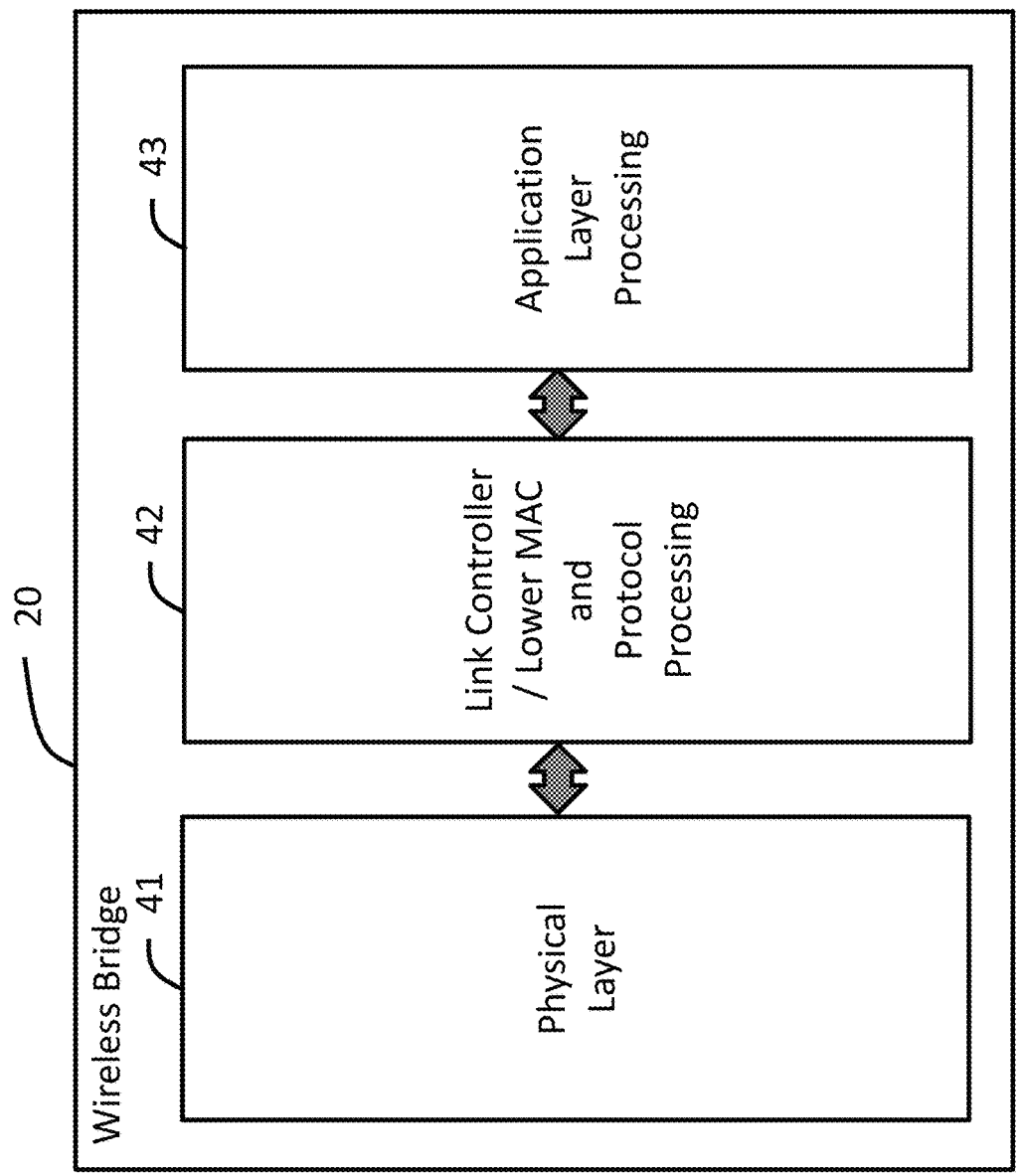
FIG. 4 shows a further conceptual block diagram of a wireless bridge device according to various aspects of the disclosure.

FIG. 4 shows a higher-level conceptual block diagram of wireless bridge 20, according to various aspects of the disclosure. On a high level, wireless bridge may contain three components: a physical layer 41, a link controller/lower MAC and protocol processing component 42, and an application layer processing component 43. The physical layer component 41 may include hardware, software and/or firmware that may implement physical layer functionalities, e.g., as shown in FIG. 3. Components of physical layer component 41 will be discussed further below but may include, for example, but are not limited to, one or more antennas, RF and analog circuitry, front-end digital hardware, modems, and control hardware, software, and/or firmware. The link controller/lower MAC and protocol processing component 42 may be used to implement various protocols of, e.g., the data link, network, transport, session, presentation, and to some extent, application layers of the OSI model. Link controller/lower MAC and protocol processing component 42 may, again, include portions implemented in hardware, software, and/or firmware. Application layer processing component 43 may, to some extent, overlap with link controller/lower MAC and protocol processing component 42, insofar as both components may address application-layer processing. The application layer processing component 43, however, is separated from protocol processing component 42 to show that it may perform data and signaling adaptation for interfacing the WLANs and/or WWANs and/or broadcast 21, as will be discussed below. In practice, components 42 and 43 may be implemented with common components and need not be separated.

Figure 5A:
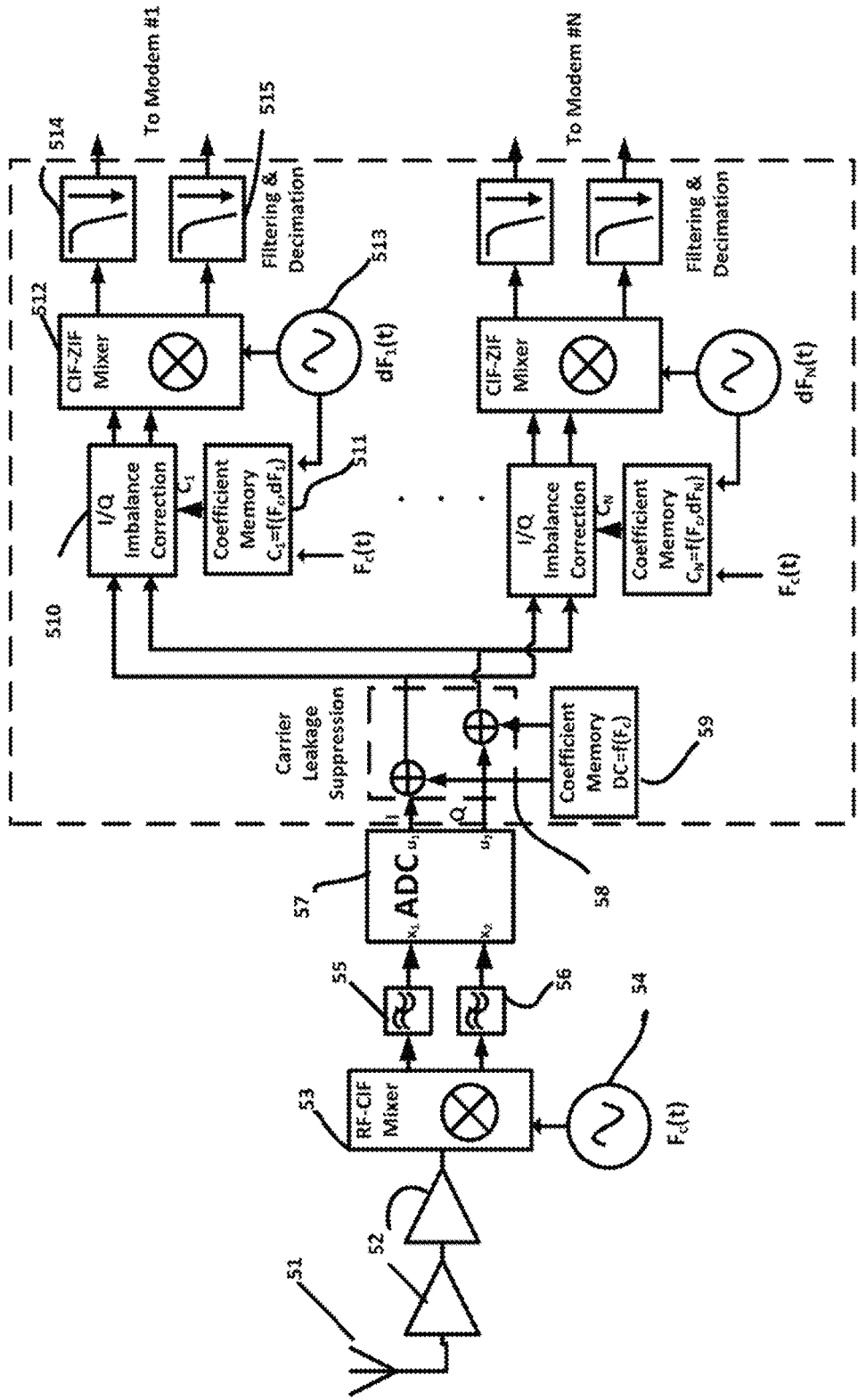
FIGS. 5A and 5B show a conceptual block diagram of a FHSS-MA digital front end (within the dashed boxes; example analog front-end components are shown outside the dashed boxes) according to an aspect of the disclosure
Figure 5B:
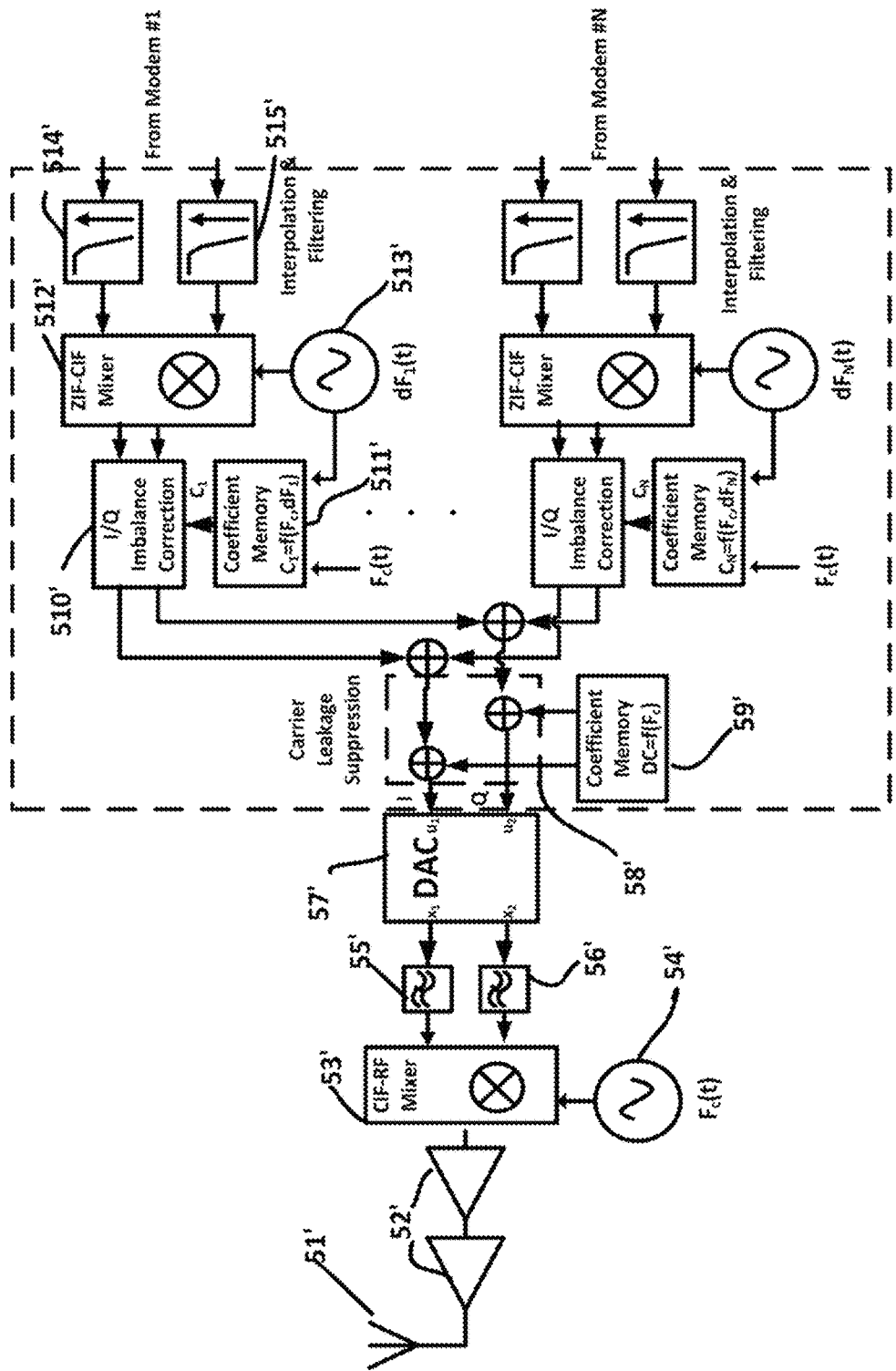
Figure 5C:
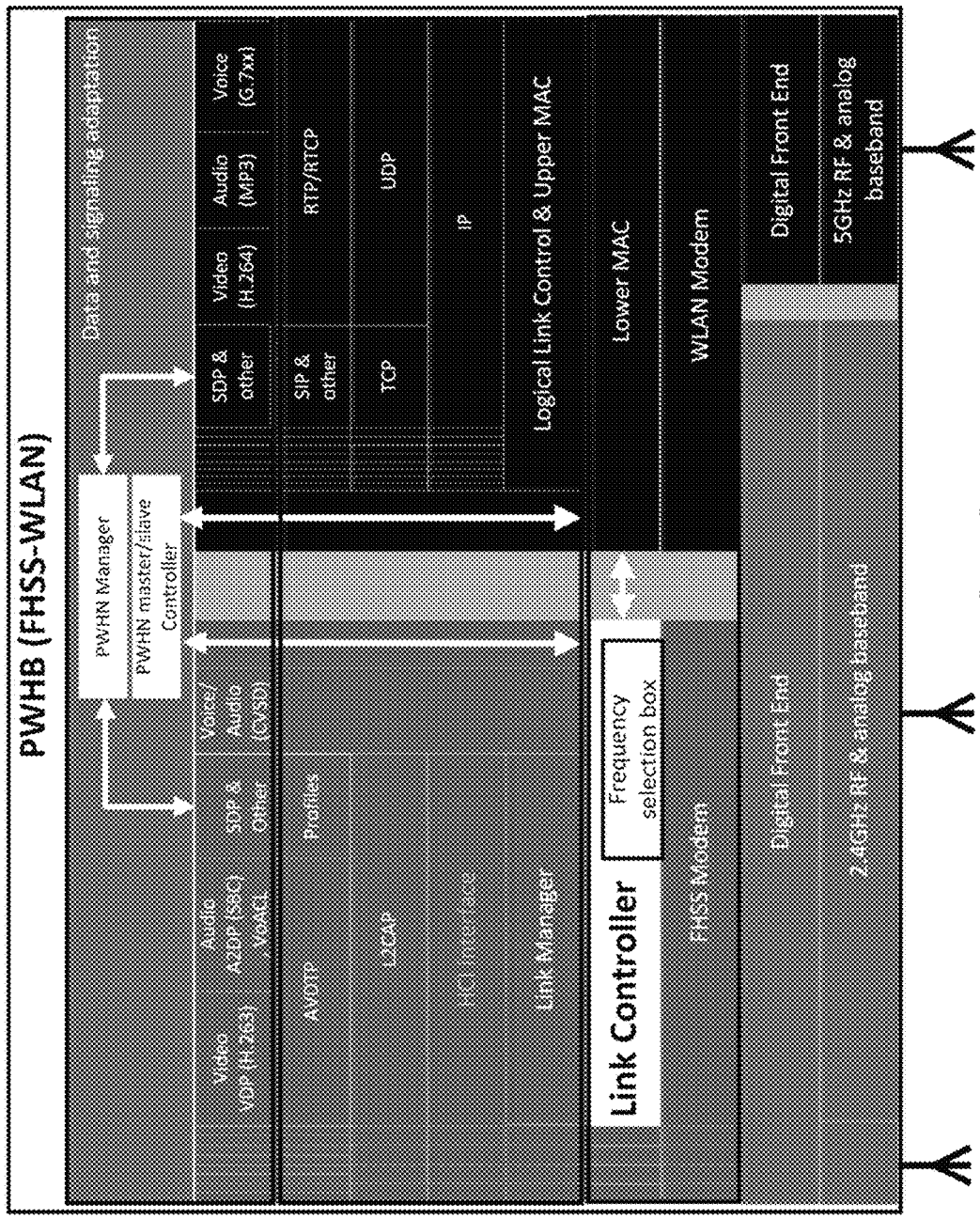
FIG. 5C shows where these components may fit, conceptually, in the hierarchy of FIG. 3.

Among the components contained in physical layer component 41 may be one or more multi-channel FHSS-MA digital front ends. FIG. 5, which includes FIGS. 5A and 5B, shows an example of a transceiver that shows a digital front end (in FIGS. 5A and 5B) of such a multi-channel FHSS transceiver, according to various aspects of the disclosure. In FIG. 5, FIG. 5A shows an example of a digital front end of a receive side of the transceiver, while FIG. 5B shows an example of a digital front end of a transmit side of the transceiver. It should be appreciated that the apparatus of FIG. 5A and the apparatus of FIG. 5B may be individual apparatus or may be combined and may share at least some components. For example, antennas 51 and 51' may be shared; a switch, circulator, duplexer or other multiplexing device (not shown) may then be inserted to share the antenna. Physical layer component 41 may additionally incorporate a receiver (RX) antenna diversity scheme (e.g., where the corresponding outputs of two or more multi-channel FHSS-MA digital receive front ends may be combined (e.g., maximal ratio combiner (MRC))) or selected to form a single output), and may additionally incorporate a transmitter (TX) antenna diversity scheme (e.g., in which the input to two or more multi-channel FHSS-MA digital transmit front ends may be individually delayed).

In FIG. 5A, a radio frequency (RF) signal may be received using antenna 51. Antenna 51 is not limited to a particular type of antenna and may also represent an array of antennas with associated processing to combine their received signals (as is known, such processing may be performed at various different points in the receive apparatus of FIG. 5A, and the invention is not limited to any particular implementation or location of antenna signal processing within the apparatus). The received signal (or signals) may be filtered and amplified 52, using one or more amplification stages (two are shown, but there may be fewer or more stages). The result may be mixed in an RF-CIF mixer 53 with a signal $F_c(t)$ generated by frequency generator 54 to convert the RF signal to a complex intermediate frequency (CIF) signal having in-phase (I) and quadrature (Q) components, which may be low-pass filtered 55, 56 to retain the low-pass I and Q components. The low-pass I and Q components may then be fed to an analog-to-digital converter (ADC) 57 and converted to digital form; note that ADC 57 may comprise separate ADCs for the I and Q channels but is shown as a single block having two parallel channels. Values may be added to the digitized I and Q components in a local oscillator (LO) carrier leakage suppression stage 58, where the values may be stored in a coefficient memory or look-up table 59 and may be a function of the down converter, possibly time-varying, frequency $F_c(t)$ (note that, in various locations of this disclosure, expressions of the type, "$F_x(t)$" or "$dF_x(t)$" may be used to refer to a signal or its corresponding frequency, which may be time-varying); alternatively, block 59 may be a value computation block that computes the values as a function of $F_c(t)$. Various carrier leakage suppression techniques are known in the art, and the particular carrier leakage suppression technique used here is not limited to any particular technique. The I and Q outputs of the carrier leakage suppression stage 58 may be fed to N parallel signal paths, corresponding to N FHSS hopping sequences. The N parallel signal paths will be described using the first parallel signal path, and it should be understood that the other signal paths may be substantially identical, except for various parameters (e.g., frequencies and coefficients).

In the first parallel signal path, the I and Q outputs of the carrier leakage suppression stage 58 may be fed to I and Q inputs of an I/Q imbalance correction block 510. The I/Q imbalance correction block may receive a set of coefficients $C_1$ from a coefficient memory 511 (which may be a look-up table), where coefficients $C_1$ may be a function of $F_c(t)$ and $dF_1(t)$ (i.e., $C_1=f(F_c,dF_1)$ may be used to express the relationship between the coefficient $C_1$, frequency $F_c(t)$, and frequency $dF_1(t)$). As an alternative, $C_1=f(F_c,dF_1)$ may be computed as needed, in a coefficients computation block 511. Note that block 511, whether a memory, look-up table, or computation block, may be a separate block for each parallel signal path or may be shared among two or more of the N parallel signal paths; in the form of a memory or look-up table, it may further be shared with coefficient memory 59. It is noted that multiple I/Q imbalance correction techniques are known in the art, and the inventive concept is not limited to any particular one of these techniques. A frequency selection box 513 may be used to generate $dF_1(t)$, which may be fed to block 511 and to a frequency generator that feeds a CIF-ZIF mixer 512. $dF_1(t)$ may represent a particular hopping sequence. The CIF-ZIF mixer 512 may receive the corrected I and Q signals from I/Q imbalance correction block 510 and may mix these signals with $dF_1(t)$, which may be a digital hopping sine wave, to convert the CIF I and Q signals to zero-intermediate frequency (ZIF) I and Q signals. The ZIF I and Q signals may then be low-pass filtered and decimated 514, 515 and fed to a corresponding modem (denoted Modem #1 for the first signal path), in which the resulting signals may be demodulated and data may be derived and sent to higher layers of wireless bridge 20 for further processing.

The transmit side of the transceiver, as shown in FIG. 5B, may operate in a similar fashion, but in reverse. In particular, digital ZIF I and Q signals from a modem (again, using the first parallel signal path of the transmit side for description purposes, this may be Modem #1) may be undergo interpolation and filtering 514', 515', and the results may be fed to ZIF-CIF mixer 512', where they may be mixed with a digital version of a waveform having a sequence of hopping frequencies $dF_1(t)$ from a frequency generator 513' to generate CIF I and Q signals. The CIF I and Q signals may be fed to an I/Q imbalance correction block 510', where they may be corrected using a coefficient obtained from a coefficient memory (or generator, as discussed above) 511'. It is once again noted that multiple I/Q imbalance correction techniques are known in the art, and the inventive concept is not limited to any particular one of these techniques. The I signals and the Q signals from the parallel signal paths may then be added and fed to a carrier leakage suppression block 58', where values generated by or stored in block 59' may be added, similarly to as described above. The thus-compensated digital signals may then undergo digital-to-analog conversion in a digital-to-analog converter (DAC) 57'; again, DAC may be a single block or separate blocks, as discussed above. The analog I and Q signal outputs of the DAC may then be low-pass filtered 55', 56', mixed in CIF-RF mixer 53' with a carrier frequency signal $F_c(t)$, which may be generated by frequency generator 54' (which may be the same as component 54 of FIG. 5A), amplified 52', and transmitted via antenna 51'. Again, there may be one, two or more amplification stages 52', and the antenna 51' is not limited to a single antenna (and there may associated processing hardware and/or software, as known in the art, if there are multiple antennas).

It is further noted that one or more of the operations of the digital front end, as in FIGS. 5A and 5B, may be implemented by means of one or more processors and associated software instructions that may cause the one or more processors to implement the operations.

Returning to FIG. 3, the digital front end, as shown in FIG. 5, may be used as part of a physical layer 31 of wireless bridge 20. As shown in FIG. 3, the physical layer 31 may include digital and analog/RF components. The components may be configured in various ways, examples of which are shown in FIG. 6, which consists of FIGS. 6A, 6B, and 6C.

Figure 6C:
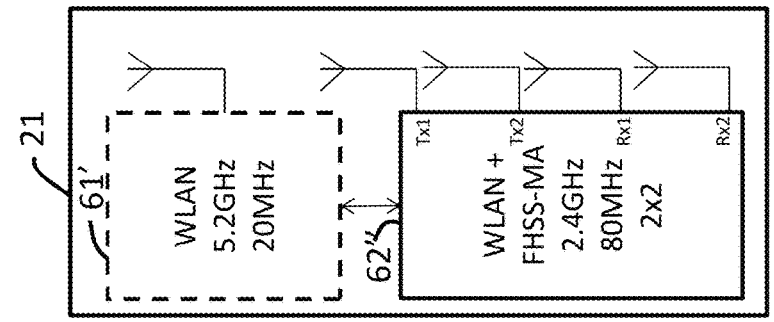
Figure 6B:
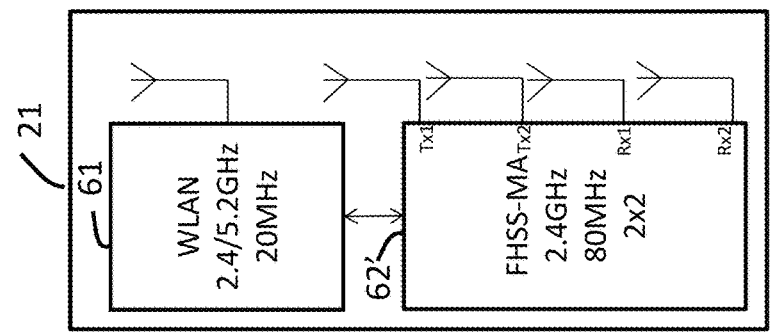
Figure 6A:
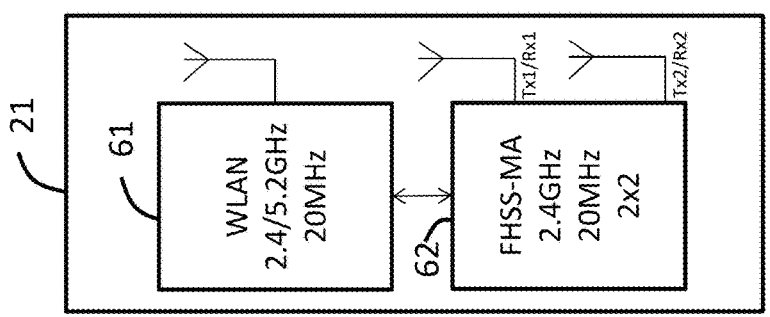
Figure 6E:
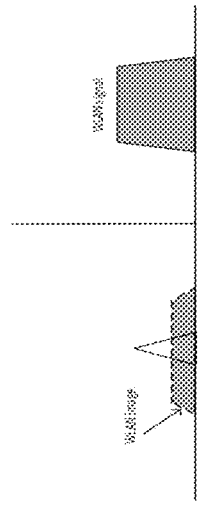
FIGS. 6D and 6E show example spectra of various signals discussed in conjunction with FIGS. 6A-6C.
Figure 6D:
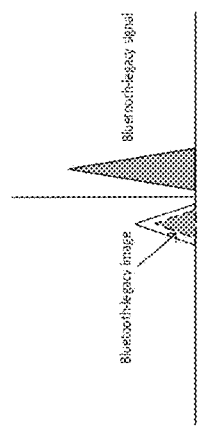

FIG. 6A shows an example of a wireless bridge 20 that is capable of providing communications with a WLAN and enhanced FHSS-enabled devices (e.g., Bluetooth®-enabled devices, but not limited thereto); enhancements will be discussed below and may address aspects of networking that may improve capacity and/or may avoid interference, which may include time and/or frequency coordination. In this scenario, wireless bridge 20 may include a WLAN module 61 (which may also or alternatively include WWAN communication capabilities) and a FHSS-MA module 62 capable of communicating with multiple FHSS-enabled devices. Some FHSS-enabled devices (e.g., Bluetooth®-standard devices) may not be supported by the wireless bridge 20; for example, such legacy devices may dictate their own frequency hopping (FH) sequences and not permit coordination or may, alternatively, use hopping frequencies outside a current frequency band associated with FHSS-MA module 62, e.g., centered at $F_c(t)$, as shown in FIG. 5. An example of interference of other devices (e.g., Bluetooth®-standard devices) due to radio I/Q imbalance is shown in FIG. 6D. The circuitry shown in FIG. 5 may be used to dynamically mitigate such interference.

FIG. 6B shows an example of a wireless bridge 20 that may also support legacy devices (e.g. Bluetooth®-standard devices) not supported by the configuration of FIG. 6A, in addition to enhanced FHSS-enabled devices (e.g. Bluetooth®-enabled devices). Module 61 may be substantially the same as module 61 of FIG. 6A. However, FHSS-MA module 62' may have the capability of communicating with both types of FHSS-enabled devices. To accomplish that, for example, module 62' may include dual sets of decoupled antennas and may support larger bandwidth (e.g., ~80 MHz, the full 2.4 GHz band that may be used for FHSS-enabled devices). The interference of other signals (e.g., WLAN) due to radio I/Q imbalance is shown in FIG. 6E. The circuitry presented in FIG. 5, again, may dynamically mitigate such interference.

In yet a further example, as shown in FIG. 6C, wireless bridge 20 may take advantage of common frequencies to rearrange the functionalities of the two modules. It is noted that WLANs may be supported in both the 2.4 GHz and 5.2 GHz frequency bands, while the FHSS-MA may be supported in the 2.4 GHz band. Therefore, the example of FIG. 6C integrates the WLAN and FHSS-MA 2.4 GHz functionalities into a single module 62" while separating out the WLAN-5.2 GHz functionality into a separate module 61'. The possibility of using an integrated module 62" is facilitated by the fact that the full 2.4 GHz band (i.e., ~80 MHz bandwidth) may be supported by the analog front-end portions of module 62" (and 62'), so it may thus be possible to simply include additional digital processing capabilities to accommodate the WLAN signals received in that band. If desired, one need not even support the WLAN 5.2 GHz communication, in which case module 61' may be omitted completely.

Figure 7:
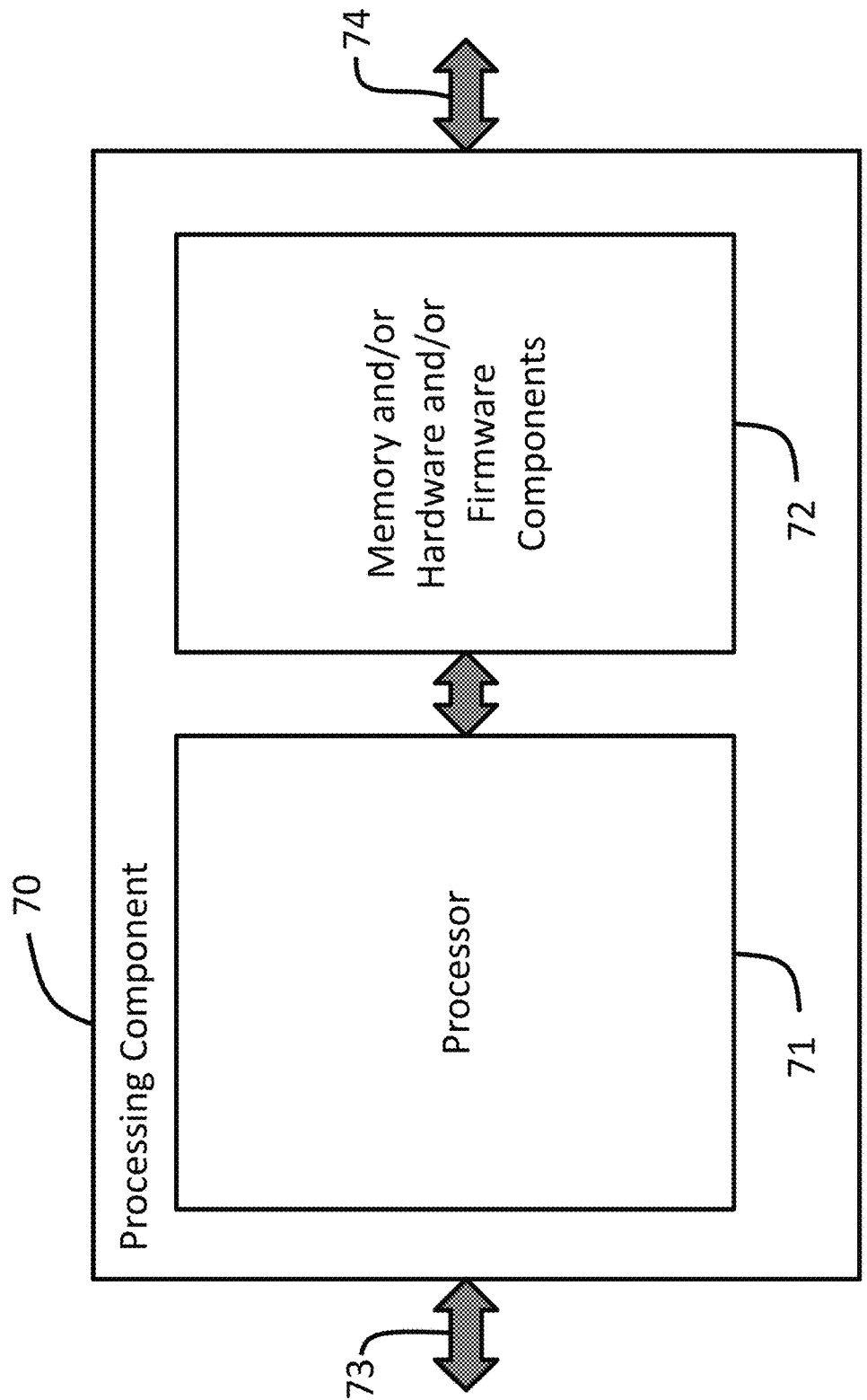
FIG. 7 shows an example of an implementation of various processing components according to various aspects of the disclosure.

Returning to FIG. 4, link controller/lower MAC and protocol processing component 42 and/or application layer processing component 43 may be implemented in various ways, as discussed above. One example implementation, according to an aspect of the disclosure is demonstrated in FIG. 7. FIG. 7 shows a processing component 70, which may correspond to protocol processing component 42, application layer processing component 43, portions of processing components 42, 43, a combination of portions of processing components 42, 43, or a combination of processing components 42, 43, for example. Processing component 70 may include one or more processors 71 and one or more further components 72, which may include memory (which may contain data and/or software program instructions that may be designed to cause the processor to execute various operations), hardware (e.g., programmable hardware, look-up table(s), field-programmable gate array(s) (FPGAs), logic devices, etc.) and/or firmware, that may be configured to work in cooperation with processor 71. The combination of processors 71 and other components 72 may be used to implement various communication protocols, e.g., but not necessarily limited to, those shown in FIG. 3 and/or described below. Processing component 70 may further include one or more I/O components 73, 74 that may be used to interface with other components of wireless bridge 20 and/or with components external to wireless bridge 20. The one or more I/O components 73, 74, may, for example, provide data to or from processing component 70, permit transfer of software or programming of hardware, etc., but are not necessarily limited thereto.

It is further noted that within physical layer component 41 of FIG. 4, it has been previously discussed that operations performed by the digital front end, as shown in FIGS. 5A and 5B, may be implemented by means of logic circuitry and/or one or more processors configured to execute software instructions to implement various operations. Processing component 70 represents an example of an implementation of all or part of the digital front end processing within physical layer component 41, according to an aspect of this disclosure.

A number of techniques may be integrated into the link controller/lower MAC and protocol processing and/or application layer processing components 42, 43 and/or into compatible devices 10, 11. Specifically, the Bluetooth® standard protocol may be enhanced using these techniques. Bluetooth® standard terminology may be used to describe these techniques. One technique may involve the synchronization of the time-division duplexing mechanism of multiple FHSS-enabled physical channels within a common wireless bridge 20, to avoid TX and RX time overlap between them. Synchronization of FHSS-enabled physical channels within a common wireless bridge 20 may be achieved by the wireless bridge initiating master-slave role-switching after connecting to a master FHSS-enabled device, to become the master of the physical channel (assuming the FHSS-enabled master device allows it, e.g., via accepting command HCI_Write_Link_Policy_Settings) and, therefore, the master of the clock. By sharing a common local clock, all physical channels within the wireless bridge 20 may thus be synchronized. As a result of this synchronization, all FHSS-enabled wireless bridge basic or adapted physical channels (note that "adapted" is intended to refer to channels used in adapted frequency hopping (AFH)) may transmit and receive simultaneously; three such time synchronization examples, assuming five physical channels in a wireless bridge 20, are found in FIGS. 8A, 8B, and 8C. FIG. 8A shows an example in which one or more master devices, i.e., wireless bridges 20, may transmit audio/video content in one time interval, while various slave FHSS-enabled devices may simultaneously send acknowledgments, which may be followed by simultaneous transmission of voice communications by master(s) and then slave(s). FIG. 8B shows an example in which master and slave devices may alternate time slots, e.g., for transmitting voice. FIG. 8C shows an example in which masters may simultaneously send audio/video, followed by simultaneous acknowledgments from multiple slave devices. Legacy Bluetooth®-standard devices may be compatible with this technique.

Figure 9A:
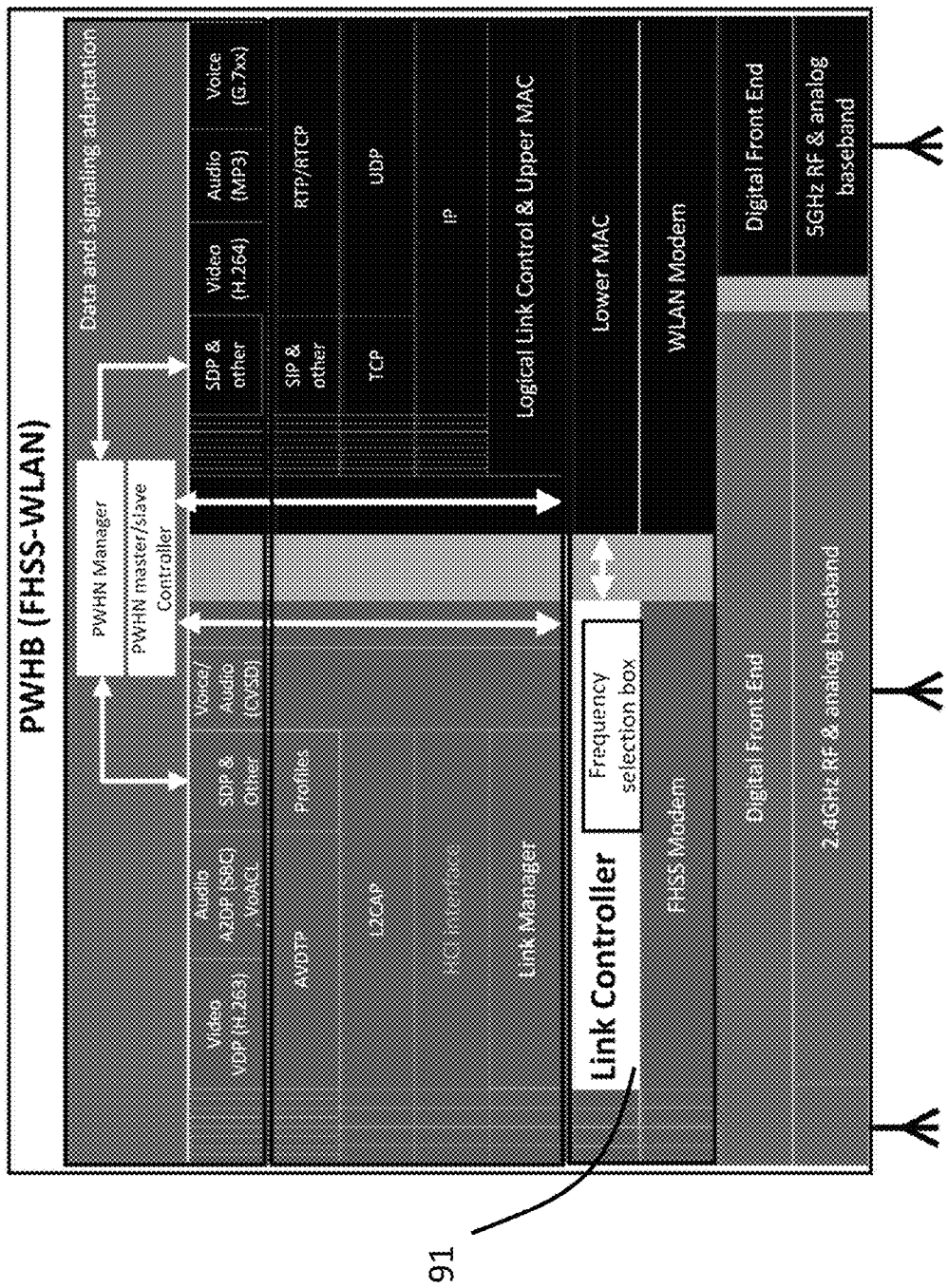
FIG. 9, consisting of FIGS. 9A-9C, shows a conceptual example of a frequency coordination technique according to an aspect of the disclosure.
Figure 9C:
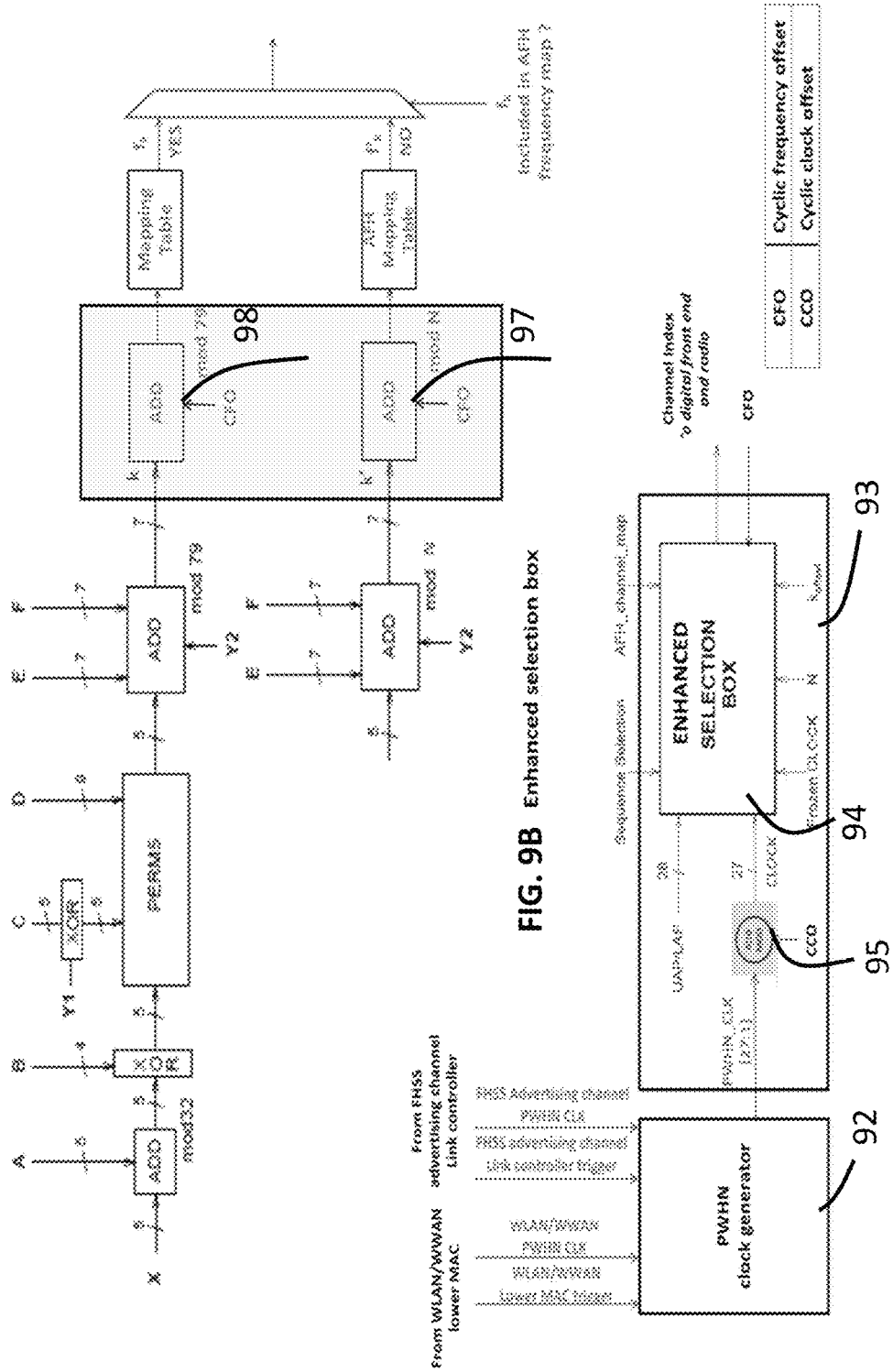

Another technique for mitigating interference may be the use of frequency coordination within a common wireless bridge 20. The frequency coordination mechanism may be incorporated into the link controller 91, as shown in FIG. 9A. This may complement the time synchronization discussed above and may further decrease FHSS-enabled devices TX collision probability. In particular, using these techniques, it may be possible to obtain FHSS physical channels that never transmit simultaneously using the same frequency when in connection state. This may be achieved by using a modified version of a standard Bluetooth® frequency selection box 93 (part of the link controller/lower MAC layer), as shown in FIGS. 9B and 9C. First, using time synchronization, as discussed above, FHSS clocks of all physical channels may be identical and may be driven by a common reference clock generator 92. The wireless bridge device address BD_ADDR and all other parameters may be common to all physical channels. As a result, identical frequency hop sequences may be generated by all physical channels. By uniquely assigning to each basic or adapted physical channel a fixed cyclic frequency offset (CFO), which may be applied by components 97-98, the channel indices, representing frequencies, may become distinct from each other in connection state. CFO=0 may be a reserved physical channel for connecting to Bluetooth®-standard devices that do not support the enhanced protocol, which includes a CFO parameter, and for modes other than connection mode (paging modes or inquiry modes). A field dedicated to the CFO parameter may be added to the enhanced Bluetooth® FHS packet.

In order to allocate more than a single physical channel to legacy Bluetooth® devices, each physical channel in the wireless bridge 20 may be uniquely assigned with a cyclic clock offset (CCO), e.g., using component 95, prior to sequence selection block 94. By assigning different CCOs to the legacy physical channels in connection mode, the TX collision probability of physical channels may be minimized. The reference clock to be conveyed to the legacy Bluetooth® device when establishing connection (i.e., clock offset field in a FHS packet) may include the CCO clock offset (output of component 95).

FIGS. 10A and 10B show how FHSS collision avoidance may work in respective cases in which there is up to one physical channel allocated to legacy Bluetooth® devices vs. more than one physical channel allocated to legacy Bluetooth® devices. In general, adaptive frequency hopping (AFH) may be used, and the slave devices (e.g., FHSS-enabled devices 10, 11) wirelessly connected to a master (e.g., wireless bridge 20) may communicate channel assessment reports to the master, which may assist the master to set AFH channel maps. In the example of FIG. 9, a common AFH channel map may be used, and the use of the CFO and CCO may serve to mitigate FHSS-MA inter-channel interference and may altogether eliminate such interference, in some cases. FIG. 10A shows the case of a common AFH channel map in an 80 MHz overall frequency band. As shown, 40 MHz may be reserved for WLAN communications, and the other 40 MHz may be used for FHSS-MA communication between the wireless bridge(s) 20 and the FHSS-enabled devices 10, 11. In FIG. 10A, there is up to one physical channel allocated for legacy Bluetooth® devices, and channel assignment may result in no collisions when all devices are in connection mode, as shown. In FIG. 10B, there are multiple physical channels assigned to legacy Bluetooth® devices, and as shown, a collision may occur (device 1 may be a legacy Bluetooth® device, and it is shown interfering with device 6); this is because device 1 does not use the enhanced frequency selection box 93, as in FIG. 9. As a result, its hopping sequence may not be distinct from the other FHSS-enabled devices, so collisions may occur.

Another technique that may be used to minimize legacy Bluetooth® physical channel interference would be to assign to the legacy Bluetooth® physical channel a frequency hop set that has the least number of frequencies in common with the hop set of the other physical channels supported by the particular wireless bridge 20. If the number of available frequencies for FHSS-MA communications is significantly greater than the minimum hop set size allowed (i.e., 20), this may assist further in avoiding collisions.

FIGS. 11A, 11B, and 11C show techniques that may be used to reduce the power consumption of the FHSS-enabled devices and speed up discovery and connection between the wireless bridge and the devices. FIG. 11A shows where, in the hierarchy of FIG. 3, this may be implemented. As shown in FIG. 11B, a FHSS-MA wireless bridge 20, the wireless bridge 20 may be able to perform multi-channel signaling 112 in parallel to multi-channel data communications 111. Multi-channel signaling may include multi-channel inquiry and multi-channel paging. Multi-channel signaling may be initiated by one or more link controllers (thus, the number of link controllers and modems can be smaller than the number of frequency channels used for signaling, for example, by replicating the signaling waveform across multiple channels when transmitting, and/or receiving first-to-arrive inquiry and paging response across multiple channels). An example of such signaling, performed in parallel to multimedia data communications, is shown in FIG. 11B. By signaling on multiple channels, FHSS-enabled devices' 10, 11 power consumption may be dramatically reduced during standby mode, in case the device 10, 11 expects to connect to a wireless bridge. For example, instead of a Bluetooth® classic device scanning a channel for duration of 10 msec, the device scan duration may be reduced to 2 msec, extending its standby-time approximately five-fold.

FIG. 11C shows another technique that may be used to reduce the power consumption of the FHSS-enabled devices 10, 11 and speed up discovery and connection between the wireless bridge 20 and the devices. Wireless bridge 20 may be able to perform multi-channel scanning 113 in parallel to multi-channel data communications 111 to detect FHSS-enabled devices 10, 11 signaling and to establish multimedia connections with these devices. For example, by scanning the three Bluetooth® Low Energy (BLE) advertising channels simultaneously, wireless bridge 20 can establish a BLE connection with dual-mode Bluetooth® 4.0 (Bluetooth® classic and BLE) advertising devices 10, 11, which may be followed by switching to classic Bluetooth® connection to support higher duty cycle voice/audio/video communications. By scanning the advertising channels simultaneously, an advertising interval of devices 10, 11 may be extended, in case the device 10, 11 expects to connect to a wireless bridge, which may thus extend its stand-by time by three-fold.

Figures 12A, 12B:
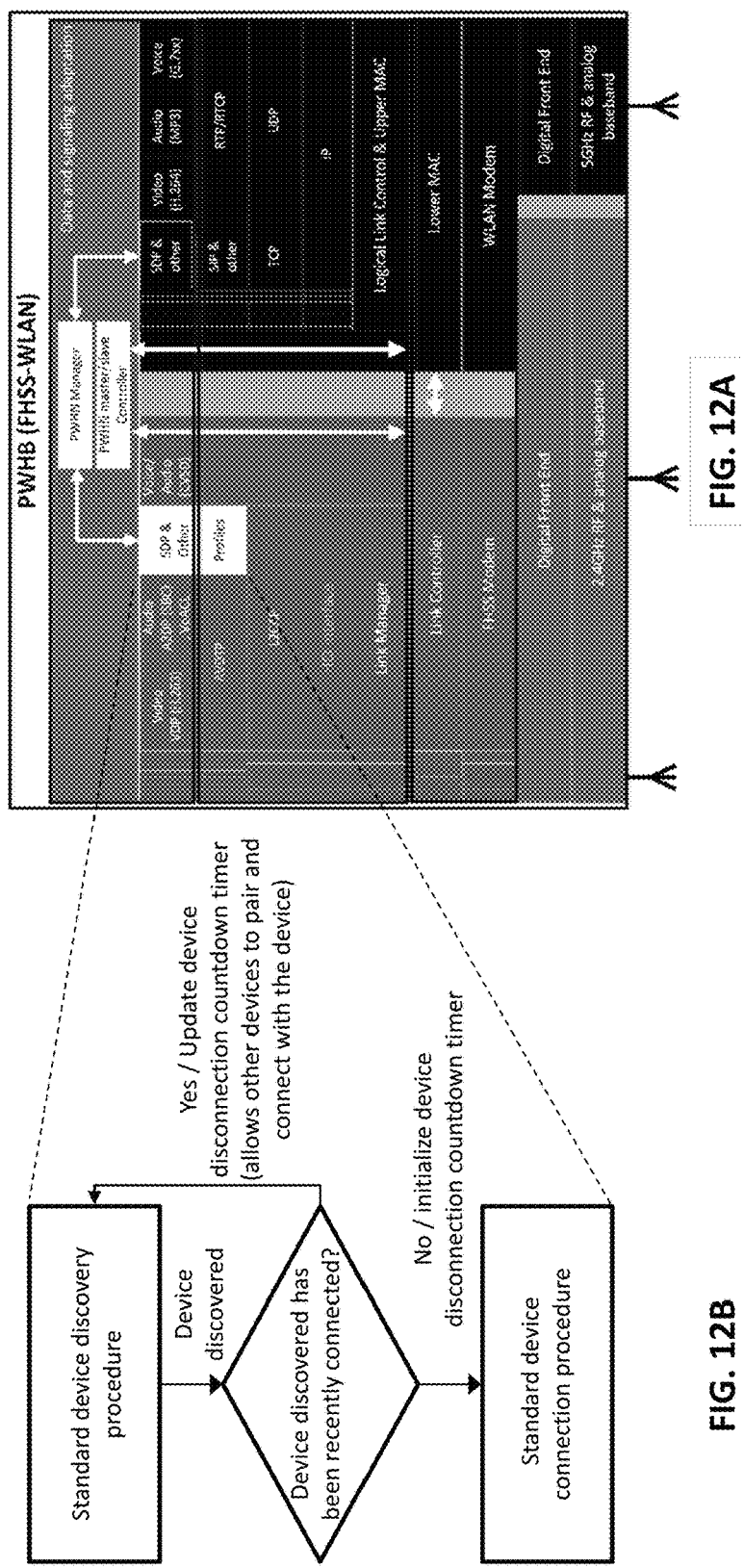
FIGS. 12A and 12B show a conceptual state machine of reconnecting to a FHSS-enabled device that may be used for reduction of device power consumption and/or to speed up pairing, according to various aspects of the disclosure.

The wireless bridge device 20, according to various aspects of this disclosure, may further be able to delay re-pairing and physical link establishment with a recently paired/connected FHSS-enabled (e.g., Bluetooth®-enabled) device 11, as shown in FIG. 12B, to enable the FHSS-enabled device 11 to connect with a personal device 10 (e.g., smartphone), and vice versa, i.e., the personal device 10 (e.g., smartphone) may be able to delay re-pairing and physical link establishment with a recently paired/connected discoverable FHSS-enabled (e.g., Bluetooth®-enabled) device 11, to enable it to connect with a wireless bridge device 20. For example, this capability may be incorporated in an enhanced Generic Access Profile (GAP), as shown in FIGS. 12A and 12B, which may be compatible with Bluetooth®-standard device hardware and therefore may be supported by upgrading the Bluetooth®-protocol software stack.

The wireless bridge device 20, according to various aspects of this disclosure, may further be able to delay its role-switching with a connected yet non-authenticated FHSS-enabled (e.g., Bluetooth®-enabled) device 10, 11, to allow the device to securely authenticate and activate encryption at an upper-layer (e.g., using voice conveying personal information). Once the device is authenticated, the wireless bridge may initiate role-switching to become master of the connection, in which case the public wireless bridge frequency hopping sequence may be used, and hopping sequence may consequently no longer serve as a physical layer's security mechanism/encryption. Once the wireless bridge switches roles with the FHSS-enabled device, the now-authenticated FHSS-enabled device interference to other user devices (caused by physical channel collisions) may be mitigated, e.g., using the above-described techniques.

In the case in which wireless bridge 20 is between FHSS-enabled devices 10, 11 and a WLAN, a multi-user packet aggregation technique may be used to improve WLAN efficiency (higher throughput) with no added delay. For example, the IEEE 802.11n standard for WLANs allows aggregation of multiple MSDU (MAC Service Data Units, e.g., but not limited to, encapsulated IP datagrams) into a single aggregated-MSDU (A-MSDU) to be sent to one or multiple final destinations. A standard WLAN may forward a MSDU to the proper access category queue (e.g., voice, video, best effort or background); in a case in which multiple MSDUs with a common destination MAC address accumulate in a queue, the wireless bridge may aggregate and transmit them as an A-MSDU. FIG. 13B shows a conceptual example of how this may be used to enhance operation of wireless bridge 20 where it may be implemented in the hierarchy of FIG. 3 as shown in FIG. 13A. The WLAN host in the wireless bridge 20 may queue the data received and adapted from multiple FHSS-enabled devices in parallel queues or in an interleaved queue 131, which may permit processing and re-transmitting the aggregated data faster than with a WLAN host that queues the data serially 132 from multiple WLAN terminals, as shown in FIG. 13C.

Multiple wireless bridge devices 20 may form wireless bridge networks (sometimes referred to in this application as "PWHNs" or "public wireless heterogeneous networks"). This may involve inter-bridge communications within the FHSS-MA frequency band ("in-band") and/or within a WLAN or WWAN frequency band ("out-of-band"), which may be used to implement various protocols between/among wireless bridges 20. The protocols between/among wireless bridges may include protocols for synchronization, frequency-hop-set adaptation, discovery, resource management, load balancing and/or handoff. Wireless bridge networking functionality may be addressed in the application layer, as shown in FIG. 3 and in application layer processing 43, as shown in FIG. 4.

Figure 14A:
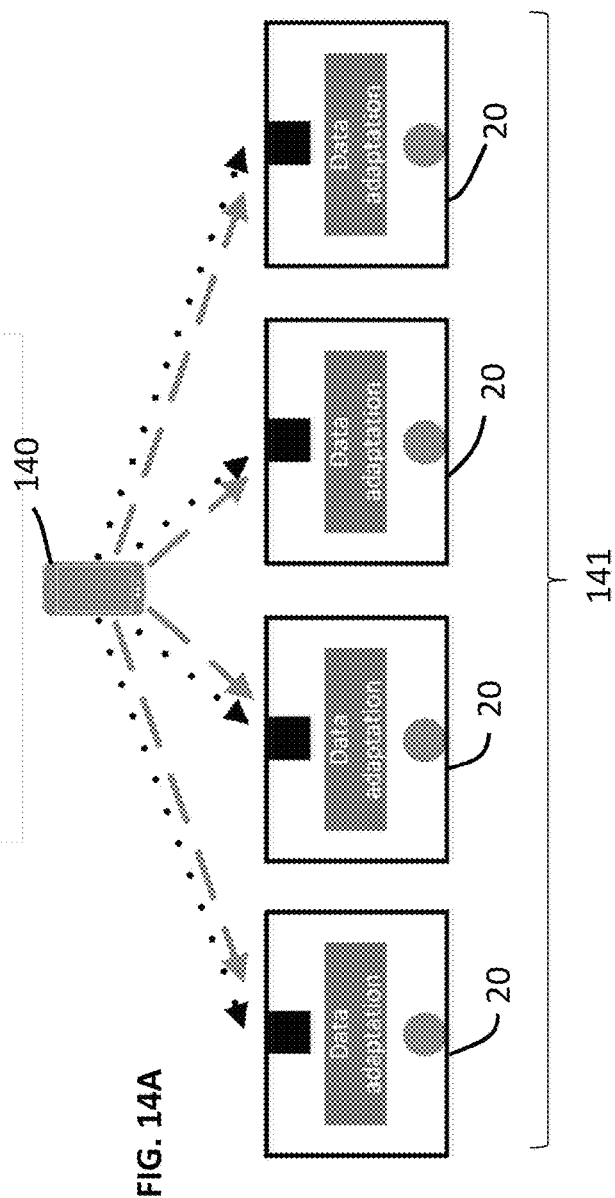
FIG. 14A shows a conceptual diagram of a wireless bridge network and its provisioning.
Figure 14B:
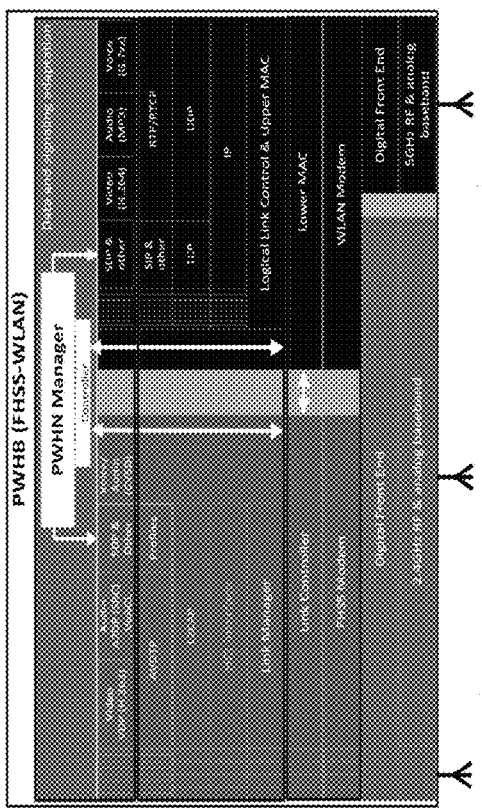
FIG. 14B shows where related concepts may be accounted for within the hierarchy of FIG. 3, according to various aspects of the disclosure.

As shown conceptually in FIG. 14A, a number of wireless bridges 20 may form a wireless bridge network 141. The wireless bridges 20 may, in order to be capable of forming wireless bridge network 141, need to be furnished with associated credentials/information. This may be a one-time procedure, following which the information may be stored in memory of the wireless bridge 20. An installer (e.g., but not limited to, an IT administrator or user) may provide a PWHN management application, e.g., as shown in FIG. 14B, with the authentication credentials that may be used to form a secure network, and which may be used to establish network connections to a group of wireless bridges 20. For example, the credentials may be transmitted from a hand-held device 140 running an appropriate application to the wireless bridges 20 over a WWAN, WLAN or FHSS-MA connection (and different wireless bridges may receive such credentials over different types of network connections, if necessary or desirable, i.e., it is not necessary that all wireless bridges 20 receive credentials using the same mode of communication). Once provided with the necessary credentials, wireless bridges 20 may establish a secure WLAN or WWAN connection with a network access point (not shown in FIG. 14A; but indicated in FIG. 15C as reference numeral 150) of the WLAN or WWAN. The wireless bridges 20 connected to the same access point using the same channel may form a wireless bridge network 141.

Once the credentials have been provided, a wireless bridge network 141 may be formed and configured. This may also be a one-time procedure, following which the associated information may be stored in a memory of the wireless bridge 20. An installer (e.g., an IT administrator or user) may provide a PWHN management application with a network policy, which may include the general usage of the network (e.g., voice/multimedia, capacity/performance) and/or other network parameters (adaptive/non-adaptive, etc.). The policy selected may also set, among other settings, a common transmit/receive time-division duplexing (TDD) pattern that may be used by all FHSS-enabled devices connected to wireless bridges 20 of a network 141 such that a wireless bridge's FHSS physical channel transmission may not overlap in time with another physical channel reception. Such a configuration is reflected, for example, in FIGS. 8A-8C. As shown in these figures, time slots may be configured for transmission and reception and may be time-synchronized, as discussed above. FIG. 8A may correspond to a configuration to stress multimedia capacity, FIG. 8B may correspond to a configuration to stress voice capacity, and FIG. 8C may correspond to a configuration to stress multimedia performance.

As a non-limiting example, if a multimedia-capacity policy, e.g., as in FIG. 8A, is selected, the TDD pattern used may be based on Bluetooth® DM3 ACL and HV3 SCO packets, which may enable up to two FHSS-enabled multimedia users per Bluetooth® physical channel ("piconet"). At this point, it is useful to discuss the effects of the time and frequency-hopping synchronization discussed above and the overall effect on such a wireless bridge network 141. In FIG. 15A, a standard FHSS-MA piconet is shown, as is currently known. In view of the enhancements discussed above, a piconet of a particular wireless bridge 20 may be extended to support more FHSS enabled devices, as shown, e.g., in FIG. 15B, which shows an extended-piconet corresponding to five piconets having three FHSS-enabled devices. According to an aspect of the disclosure, a wireless bridge may be able to support an extended-piconet that may include up to N piconets. For example, the wireless bridge 20 may support up to 2N multimedia FHSS-enabled devices using the multimedia-capacity policy as in FIG. 8A, with N voice calls and N A/V sessions, concurrently. Furthermore, given that there are four wireless bridges 20 in the wireless bridge network 141, as shown in FIG. 15C, the wireless bridge network 141 using the multimedia-capacity policy may support up to 8N multimedia FHSS-enabled devices.

The applications used to implement wireless bridge network 141 may include utilities that may further be used to monitor utilization of the network 141, discovered devices, and/or related information.

Figure 16A:
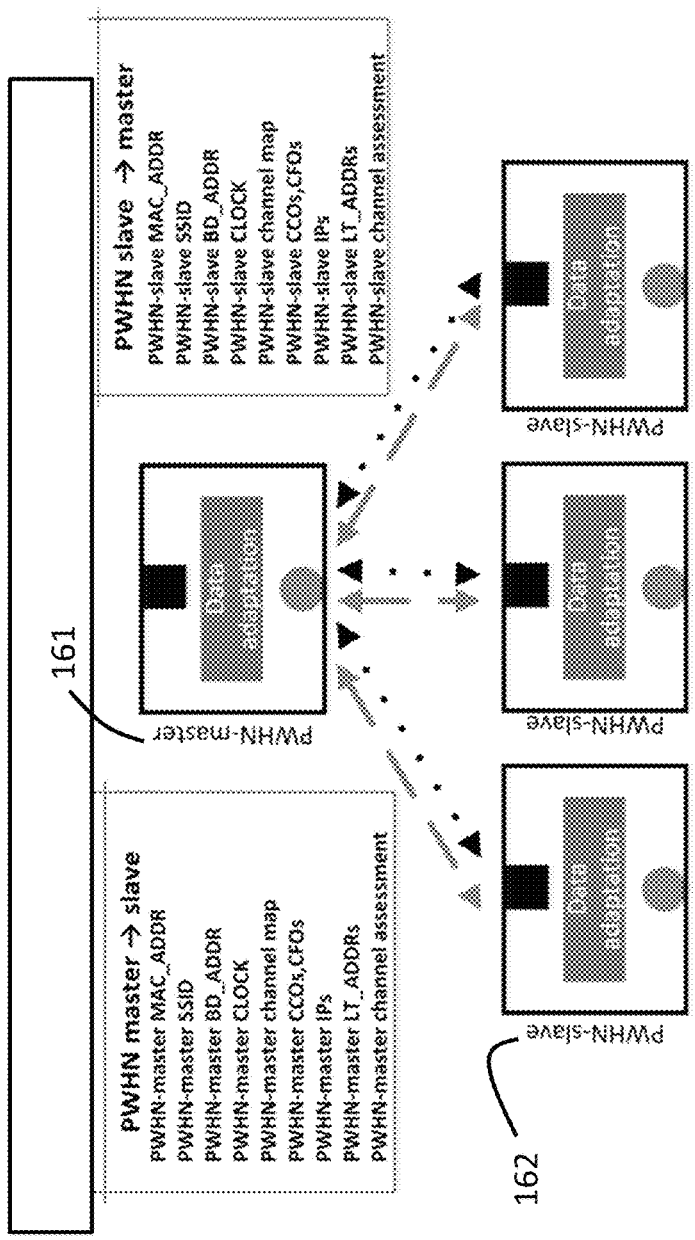
FIGS. 16A-16C show a conceptual example of organization, hierarchy, and/or control in a wireless bridge network, according to aspects of the disclosure.

According to various aspects of this disclosure, a wireless bridge network 141 may include further control protocols. These protocols may establish master-slave relationships among the wireless bridges 20. As shown in the example of FIG. 16A, one of the wireless bridge apparatuses 161, which may be referred to as the PWHN-master, may periodically establish master-slave ad-hoc communications with the other wireless bridge apparatuses (PWHN-slaves 162). This may be done either by using an out-of-band protocol (for example, by using the WLAN 802.11e Direct Link Setup protocol in parallel to its infrastructure connection to a WLAN access point), if any, or by using an in-band protocol over the FHSS-MA band (for example, over the Bluetooth® low-energy (BLE) advertising channels), to exchange information to control the network, as shown in FIG. 16A.

Synchronization of the wireless bridges 20 may be among the control functions implemented. As an initial procedure, a wireless bridge may assume the role of PWHN-master 151. According to one example implementation, to which the invention is not necessarily limited, wireless bridges 20 may be able to transmit and receive PWHN beacon packets as part of the capability to form and participate in wireless bridge networks 131. In this non-limiting example, the first wireless bridge 20 to not receive a PWHN beacon packet within a time period defined according to a predetermined network policy may become the PWHN-master 151 and may periodically transmit the PWHN beacon. In the case where the PWHN beacon times out (e.g., if the PWHN-master 151 becomes disconnected from the network), a randomly-chosen adjacent wireless bridge 20 may become the PWHN-master 151 and may start transmitting the PWHN beacons periodically. Other PWHBs (PWHN-slaves 152) may synchronize their FHSS clocks (for example, according to the Bluetooth® specification, the FHSS clock is a 28-bit 32 kHz signal) to the PWHN-master FHSS clock, which may be, but is not necessarily, conveyed by the PWHN beacon packet, such that all PWHN-slaves 152 may have identical FHSS clocks. A PWHN beacon packet may be, for example, a WLAN probe request packet or a BLE advertising packet, which may include information common to all wireless bridges to be synchronized (for example, a vendor information field, e.g., BD_ADDR, and/or network unique identifier, e.g., WLAN SSID).

As discussed above, frequency hop sets may be coordinated at the wireless bridge level. They may further be coordinated at the network level. In this process, the PWHN-slaves 162 may communicate their channel assessment reports to the PWHN-master 161 to set adaptive frequency hopping (AFH) channel maps. The PWHN-master 161 may use one of the following example techniques to mitigate FHSS-MA inter-channel interference.

In a first technique, the PWHN-master 151 may assign a common AFH channel map to all PWHN-slaves 152. By also assigning distinct CFO (Cyclic Frequency Offset) and/or distinct CCO (Cyclic Clock Offset) values to each of the network's physical FHSS channels, FHSS-MA inter-channel interference may be minimized or completely avoided. Once updated, the PWHN-master 161 may transmit the CFOs, CCOs and AFH channel map to the PWHN-slaves 152.

For example, in FIG. 10A, a PWHN network with a common AFH channel map is shown, in which twenty FHSS-enabled devices (five devices per wireless bridge) may share a 40 MHz band, with the other 40 MHz of the band reserved for the WLAN, without ever colliding, by using distinct CFO values. In FIG. 10B, the same PWHN network is shown, but where FHSS-enabled device-1 is a legacy Bluetooth® device that is shown interfering with a non-legacy FHSS-enabled device-6 reception, due to not having an FH sequence that is orthogonal to those of the other devices (i.e., device-1 has a standard frequency selection box, as in current Bluetooth® devices). It is assumed in this example that all wireless bridge apparatuses use a common BD_ADDR and a common PWHN clock, such that their frequency hop sequences are orthogonal (cyclically shifted relative to each other), which may thus avoid interference among the wireless bridges.

In a second technique, the PWHN-master 151 may assign a partially common AFH channel map to each group of FHSS physical channels to minimize inter-channel interference between such groups. This technique may be particularly useful in the case in which there are multiple legacy devices that do not support an enhanced frequency hop selection box 93 (as discussed above and shown in FIGS. 9B and 9C).

Figure 16B:
Figure 16C:
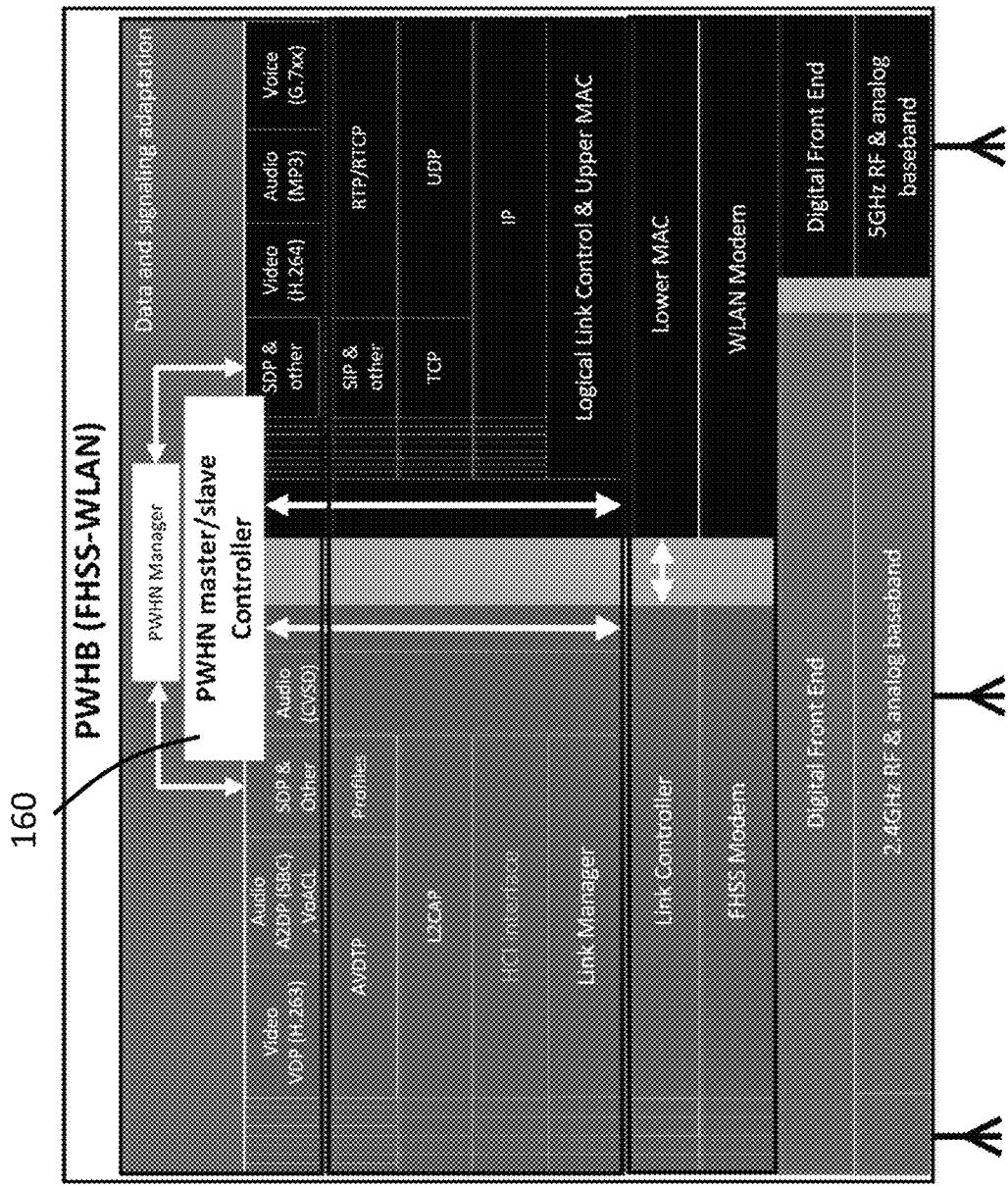

Another function that may be used in networks is that of wireless bridge discovery. In the example shown in FIG. 16B, the PWHN-master 151 may probe for additional wireless bridge apparatuses (PWHN slaves 152), which may be performed, for example, using the same PWHN beacon packet discussed above. A PWHN-slave 152 apparatus may send a response packet that may include its unique identifier in the network (e.g., a WLAN MAC address) for possibly establishing ad-hoc communications with it. The response may also include an out-of-band network unique identifier (e.g., a WLAN SSID) of the PWHN-slave 152, to distinguish between wireless bridge networks 131 for possible inter-network handoff. The response packet may be, for example, a randomly backed-off WLAN probe response or a BLE advertising response. The report may also include information related to the wireless bridge's discovered FHSS-enabled devices.

The PWHN-master 151 may also implement load balancing and/or resource management. The PWHN-master 151 may instruct a specific wireless bridge (including itself) to establish a secure/non-secure connection with a discovered FHSS-enabled device, based on discovered device information, quality of service required and/or current utilization of the wireless bridges. FHSS-enabled devices in the network area may be automatically paired, connected and parked with the selected wireless bridge.

A wireless bridge network 141 may also implement handoff of FHSS-enabled devices. A logical transport channel of an FHSS-enabled device associated with a wireless bridge 20 of a network 141 may be assigned a unique PWHN address. For example, in the case of Bluetooth®, a network address may correspond to a {CFO or CCO, LT_ADDR or PM_ADDR, packet type} triplet. The BD_ADDR of the device may also be used to uniquely identify the device within the network 141. The unique network address may be used to identify a specific logical transport channel of the device within the network 141. The wireless bridges 20 may communicate their devices' network addresses to the PWHN-master 151 to handle a handoff between wireless bridges 20. The PWHN-master 151 may initiate a handoff of an FHSS-enabled device from one wireless bridge 20 to another wireless bridge 20, based on channel assessment information associated with the wireless bridges 20 and/or the FHSS-enabled device (which channel assessment information may be based on, for example, but which is not necessarily limited to, a logical transport channel received signal strength indicator (RSSI) or packet error rate (PER)). This may be performed in various ways and retrieved by PWHN-master's 151 ad-hoc connection.

As part of a wireless bridge network 141, a wireless bridge 20 may also perform various further management and control functions, even in the role of a PWHN-slave 152. For example, if a PWHN-slave 152 receives update information from a PWHN-master 151, regarding the CFO, CCO or AFH channel map, the PWHN-slave 152 may set these parameters in the frequency hop selection device 93 and communicate them to its respective FHSS-enabled devices. A PWHN-slave 152 may also perform discovery by collecting inquiry information from one or more co-located physical channels (e.g., device addresses, names, cryptographic information, etc.), for example, by interfacing multiple Service Discovery Protocol (SDP) threads; this information may be transmitted to the PWHN-master 151.

As previously noted, a wireless bridge 20 may include various processing components, as shown, e.g., in FIGS. 4 and 7. Such processing components may include memory (which may contain data and/or software program instructions that may be designed to cause the processor to execute various operations), hardware (e.g., programmable hardware, look-up table(s), field-programmable gate array(s) (FPGAs), logic devices, etc.) and/or firmware, that may be configured to work in cooperation with processor 71, and which may facilitate the execution of various processes and protocols discussed above. Furthermore, the wireless bridge 20 may download software program instructions or other programming information via a communication network. Similarly, such software program instructions or other programming information (e.g., but not limited to, parameters/firmware for programmable hardware and/or look-up tables) may be made available via a communication network for download by one or more wireless bridges 20.

It will be appreciated by persons skilled in the art that the present invention is not limited by what has been particularly shown and described hereinabove. Rather the scope of the present invention includes both combinations and sub-combinations of various features described hereinabove as well as modifications and variations which would occur to persons skilled in the art upon reading the foregoing description and which are not in the prior art.

What is claimed is:

1. A Frequency Hopped Spread Spectrum (FHSS) signals wireless receiver apparatus comprising:
    an antenna that receives a FHSS-MA signal comprising multiple FHSS signals, and
    a radio frequency (RF) synthesizer that generates a synthesized radio frequency, and
    a RF downconverter that down-converts the FHSS-MA signal using the synthesized radio frequency to an intermediate frequency (IF) signal, and
    at least one wide band select filter with bandwidth greater-than at least 5 times the bandwidth of each of the FHSS signals, that filters the IF signal to reject out-of-band interference and outputs a filtered signal, and
    at least one analog to digital converter that converts the filtered signal to a digitized signal, and
    a I/Q imbalance correction circuit that inputs the digitized signal and outputs an array of multiple FHSS intermediate frequency (IF) I and Q signals, using an array of coefficients dynamically selected from a pre-populated coefficients memory as a function of the FHSS signals' center frequencies.

2. the apparatus of claim 1 further comprising:
    An array of IF downconverters that down-converts the array of FHSS IF I and Q signals to an array of FHSS zero-IF (ZIF) or low-IF (LIF) signals and
    An array of Channel filters that filters the array of FHSS ZIF or LIF signals and outputs an array of FHSS baseband signals.

3. A Frequency Hopped Spread Spectrum (FHSS) signals wireless transmitter apparatus comprising:
    a I/Q imbalance correction circuit that inputs an array of multiple FHSS intermediate frequency (IF) I and Q signals and outputs an array of imbalanced signals, using an array of coefficients dynamically selected from a pre-populated coefficients memory as a function of the FHSS signals' center frequencies, and
    a combiner that combines the array of imbalanced signals to a combined digital signal, and
    at least one digital to analog converter the converts the combined digital signal to a combined signal, and
    at least one wide band select filter with bandwidth greater-than at least 5 times the bandwidth of each of the FHSS signals, that filters the combined signal to avoid out-of-band emission and outputs a filtered signal, and
    a radio frequency (RF) synthesizer that generates a synthesized radio frequency, and
    a RF I/Q up-converter that up-converts the filtered signals using the synthesized radio frequency to a FHSS-MA signal comprising multiple FHSS signals, and
    an antenna that transmits the FHSS-MA signal.

4. The Apparatus of claim 3 further comprising:
    An array of Channel filters that filters received FHSS baseband signals and outputs an array of zero IF (ZIF) or low IF (LIF) signals and
    An array of IF up-converters that up-converts the array of ZIF or LIF signals to an array of FHSS IF I and Q signals that are input to the I/Q imbalance correction circuit.

5. Apparatus comprising of the apparatus of claim 1 and/or the apparatus of claim 3.

* * * * *